(12) United States Patent
Watanabe et al.

(10) Patent No.: US 11,237,390 B2
(45) Date of Patent: Feb. 1, 2022

(54) DISPLAY SYSTEM

(71) Applicant: NEC CORPORATION, Tokyo (JP)

(72) Inventors: Go Watanabe, Tokyo (JP); Fujio Okumura, Kanagawa (JP)

(73) Assignee: NEC CORPORATION, Tokyo (JP)

( * ) Notice: Subject to any disclaimer, the term of this patent is extended or adjusted under 35 U.S.C. 154(b) by 497 days.

(21) Appl. No.: 16/334,500

(22) PCT Filed: Sep. 15, 2017

(86) PCT No.: PCT/JP2017/033419
§ 371 (c)(1),
(2) Date: Mar. 19, 2019

(87) PCT Pub. No.: WO2018/056198
PCT Pub. Date: Mar. 29, 2018

(65) Prior Publication Data
US 2021/0341736 A1    Nov. 4, 2021

(30) Foreign Application Priority Data

Sep. 21, 2016  (JP) .............................. JP2016-184074

(51) Int. Cl.
*G02B 27/01* (2006.01)
*G02B 27/42* (2006.01)
*B60K 35/00* (2006.01)

(52) U.S. Cl.
CPC .......... *G02B 27/0101* (2013.01); *B60K 35/00* (2013.01); *G02B 27/4205* (2013.01); *B60K 2370/1529* (2019.05); *B60K 2370/23* (2019.05)

(58) Field of Classification Search
CPC .......... G02B 5/1842; G02B 5/18; G02B 5/32; G02B 27/0081; G02B 5/1861;
(Continued)

(56) References Cited

U.S. PATENT DOCUMENTS

| 7,095,562 B1* | 8/2006 | Peng | .................. G02B 27/0101 345/7 |
| 2008/0123322 A1* | 5/2008 | Tane | .................... G01C 21/265 362/23.01 |

(Continued)

FOREIGN PATENT DOCUMENTS

| JP | 2003-029196 A | 1/2003 |
| JP | 2010-139688 A | 6/2010 |

(Continued)

OTHER PUBLICATIONS

International Search Report for PCT/JP2017/033419 dated Dec. 5, 2017 [PCT/ISA/210].

(Continued)

*Primary Examiner* — William R Alexander
*Assistant Examiner* — Sharrief I Broome
(74) *Attorney, Agent, or Firm* — Sughrue Mion, PLLC

(57) ABSTRACT

This display system includes: a projection device including a phase-modulation-type spatial light modulator element, a light source radiating light to a display part of the element, and a control circuit controlling the element and the light source; and projecting reflection light of the part of the element; and a reflecting mirror reflecting projection light of the device. The control circuit displays, on the part of the element, a first pattern and a second pattern associated with display information having different definition degrees. The reflecting mirror includes a first reflection region causing reflection light of a portion where the first pattern is displayed to enter, and reflecting the light toward a first display region, and a second reflection region causing reflection light of a portion where the second pattern is displayed to enter, and reflecting the light toward a second display region.

10 Claims, 25 Drawing Sheets

(58) Field of Classification Search
CPC ........ G02B 2027/0125; G02B 27/4272; G02B
5/1828; G02B 26/0808; G02B 27/0103;
G02B 27/0172; G02B 5/1823; G02B
5/1814; G02B 6/00; G02B 2027/0118;
G02B 27/1086; G02B 27/42; G02B
27/44; G02B 5/1809; G02B 5/1819;
G03H 1/0244; G03H 1/0011; G03H
1/2249; G03H 1/265; G03H 1/0236;
G03H 1/028; G03H 2001/303; G03H
2210/20; G03H 2230/10; G03H 1/02;
G03H 1/0256; G03H 1/0891; G03H 1/26;
G03H 2001/0224; G03H 2001/2234;
G03H 2225/23; G03H 2250/36; G03H
1/0248; G03H 1/18; G03H 1/22
See application file for complete search history.

(56) References Cited

U.S. PATENT DOCUMENTS

| | | | |
|---|---|---|---|
| 2016/0054564 A1* | 2/2016 | Han | G02B 27/0101 349/11 |
| 2017/0235138 A1* | 8/2017 | Morohashi | H04N 9/3141 359/631 |
| 2017/0276938 A1* | 9/2017 | Nakashima | B60R 11/02 |
| 2018/0024361 A1* | 1/2018 | Erler | G02B 27/0103 359/13 |
| 2018/0181067 A1* | 6/2018 | Hasedzic | B60R 1/12 |

FOREIGN PATENT DOCUMENTS

| | | |
|---|---|---|
| JP | 2011-180178 A | 9/2011 |
| JP | 2015-087594 A | 5/2015 |
| JP | 2016-045252 A | 4/2016 |
| WO | 2016/103869 A1 | 6/2016 |

OTHER PUBLICATIONS

Written Opinion for PCT/JP2017/033419 dated Dec. 5, 2017 [PCT/ISA/237].

\* cited by examiner

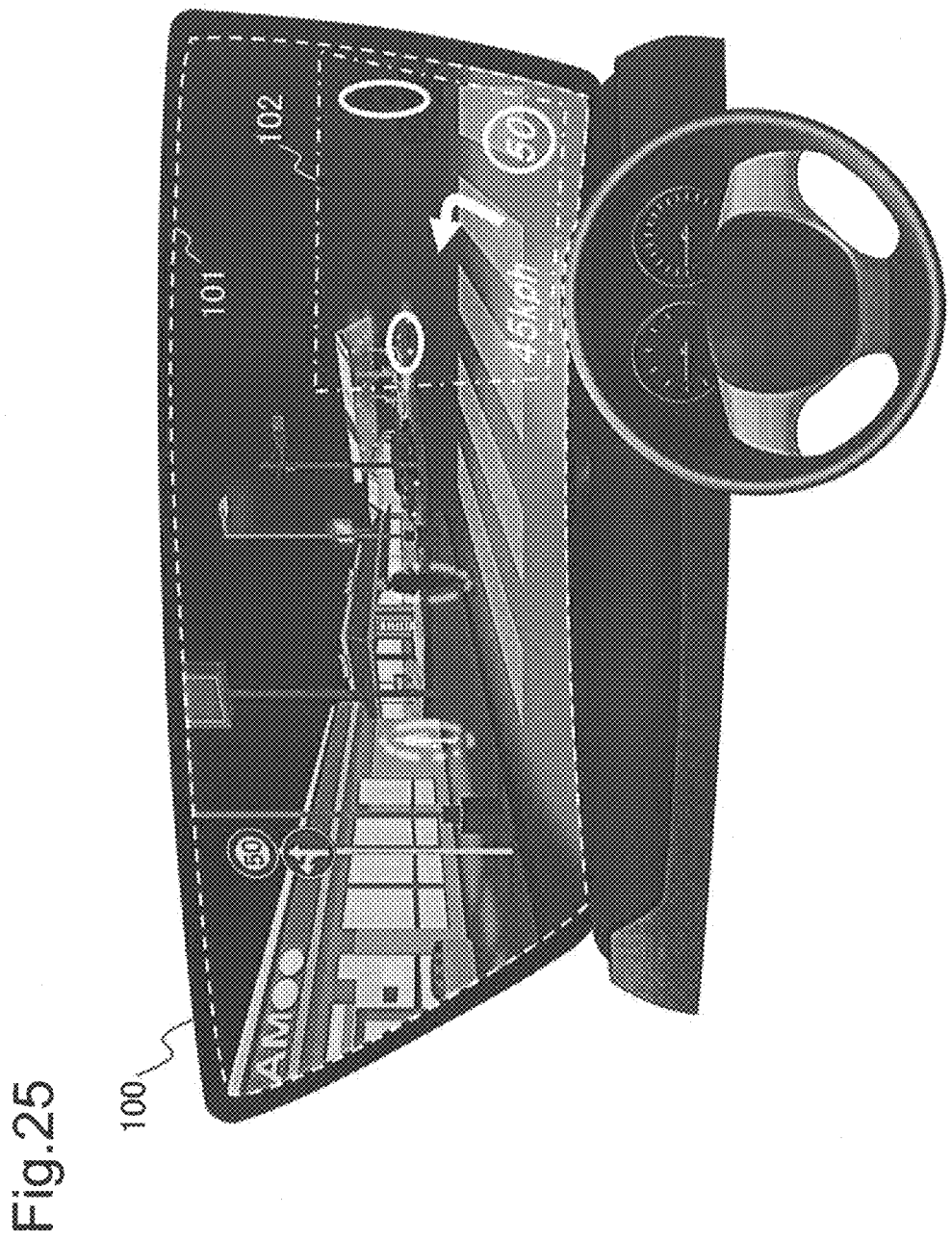

DISPLAY SYSTEM

CROSS REFERENCE TO RELATED APPLICATIONS

This application is a National Stage of International Application No. PCT/JP2017/033419 filed Sep. 15, 2017, claiming priority based on Japanese Patent Application No. 2016-184074 filed Sep. 21, 2016, the disclosure of which is incorporated herein in its entirety by reference.

TECHNICAL FIELD

The present invention relates to a display system used for an in-vehicle head-up display.

BACKGROUND ART

A head-up display (hereinafter, HUD) is a device which displays basic information about driving on a windshield. A HUD is capable of displaying information acquired from various sensors mounted on a vehicle and externally acquired information on a windshield in a way of augmented reality (AR).

PTL 1 discloses a head-up display device which visually provides various kinds of information such as instrument information to an operator of an automobile or the like. In the device in PTL 1, two holographic optical elements are attached in parallel to an inner surface of a front window, and diffraction light diffracted when light is projected to the optical elements from different projectors is observed by an operator.

PTL 2 discloses an image projection device which achieves high-luminance display by using a laser light source. The device in PTL 2 changes a projection area of a screen projected on a windshield, by controlling a scanning angle of laser light depending on a peripheral light amount and a movement speed.

PTL 3 discloses an in-vehicle head-up display device which causes a driver to visually recognize a display image reflected by a translucent reflection means, as a virtual image ahead of a windshield. The device in PTL 3 selectively displays two display images on a single display surface, reflects one of the display images toward a first reflection surface by a first reflection means, and reflects the other display image toward a second reflection surface by a second reflection means. The device in PTL 3 includes an optical path switching means for switching an optical path depending on a selected display image.

PTL 4 discloses an in-vehicle projection device which projects a display image on a display region of a windshield of an automobile. The device in PTL 4 produces an image with a modulation light flux phase-modulated by a phase modulation array, as a hologram image, on a screen. The device in PTL 4 includes a first projection mirror which reflects light including a hologram image produced on a screen, and a second projection mirror which reflects, toward a display region, projection light reflected by the first projection mirror. In the device in PTL 4, a hologram image produced on a screen is magnified by the first projection mirror and the second projection mirror, and correction of distortion of a display image resulting from inclination of the display region with respect to a line of sight of a driver is shared by the first projection mirror and the second projection mirror.

CITATION LIST

Patent Literature

[PTL 1] Japanese Unexamined Patent Application Publication No. 2011-180178
[PTL 2] Japanese Unexamined Patent Application Publication No. 2010-139688
[PTL 3] Japanese Unexamined Patent Application Publication No. 2003-029196
[PTL 4] Japanese Unexamined Patent Application Publication No. 2015-087594

SUMMARY OF INVENTION

Technical Problem

According to the device in PTL 1, it is possible to provide information to an operator over a wide range by diffracting, through adjacent two holographic optical elements, a video image projected by two projectors. However, the device in PTL 1 has a problem that, since two holographic optical elements having different characteristics are affixed to a front window, there is a feeling of strangeness at a normal time when no video image is projected. The device in PTL 1 also has a problem that two projectors are needed.

According to the device in PTL 2, it is possible to change a size or luminance of a screen depending on a peripheral light amount and a movement speed, and therefore it is possible to provide an observer with a screen or an image easy to see. However, the device in PTL 2 varies a size or luminance of a screen by moving a scanning unit, and therefore has a problem that a screen is blurred due to vibration or the like resulting from running of a vehicle.

According to the device in PTL 3, it is possible to, by use of a single display surface, cause a driver to visually recognize an information amount equivalent to that when two display surfaces are used. However, the device in PTL 3 needs to switch an optical path within such a short period as an afterimage time in synchronization with selectively displaying different display images on a single display surface, and therefore has a problem that it is necessary to actuate, at a high speed, a shutter mechanism which switches an optical path.

In order to solve the problems described above, an object of the present invention is to provide a display system which displays a high-definition image with low power, without providing a movable part susceptible to vibration.

Solution to Problem

A display system of the present invention includes: a projection device including a phase-modulation-type spatial light modulator element, a light source which radiates light to a display part of the spatial light modulator element, and a control circuit which controls the spatial light modulator element and the light source, and projecting reflection light of the display part of the spatial light modulator element; and a reflecting mirror which reflects projection light of the projection device, wherein the control circuit displays, on the display part of the spatial light modulator element, a first pattern and a second pattern associated with pieces of display information having different definition degrees, and the reflecting mirror includes a first reflection region which causes reflection light of a portion where the first pattern is displayed to enter, and then reflects the reflection light toward a first display region, and a second reflection region which causes reflection light of a portion where the second pattern is displayed to enter, and then reflects the reflection light toward a second display region.

Advantageous Effects of Invention

According to the present invention, it is possible to provide a display system which displays a high-definition image with low power, without providing a movable part susceptible to vibration.

BRIEF DESCRIPTION OF DRAWINGS

FIG. 25 is an application example of the display system according to each example embodiment of the present invention.

EXAMPLE EMBODIMENT

Hereinafter, example embodiments of the present invention is described with reference to the drawings. However, example embodiments described below are technically preferably limited in order to carry out the present invention, but the scope of the invention is not limited to the following. Note that same reference signs are given to similar parts in all of the drawings used for description of the example embodiments below unless there is some particular reason. Moreover, in the example embodiments below, there is a case where a repeated description is omitted regarding a similar configuration or operation.

First Example Embodiment

Figure 1:
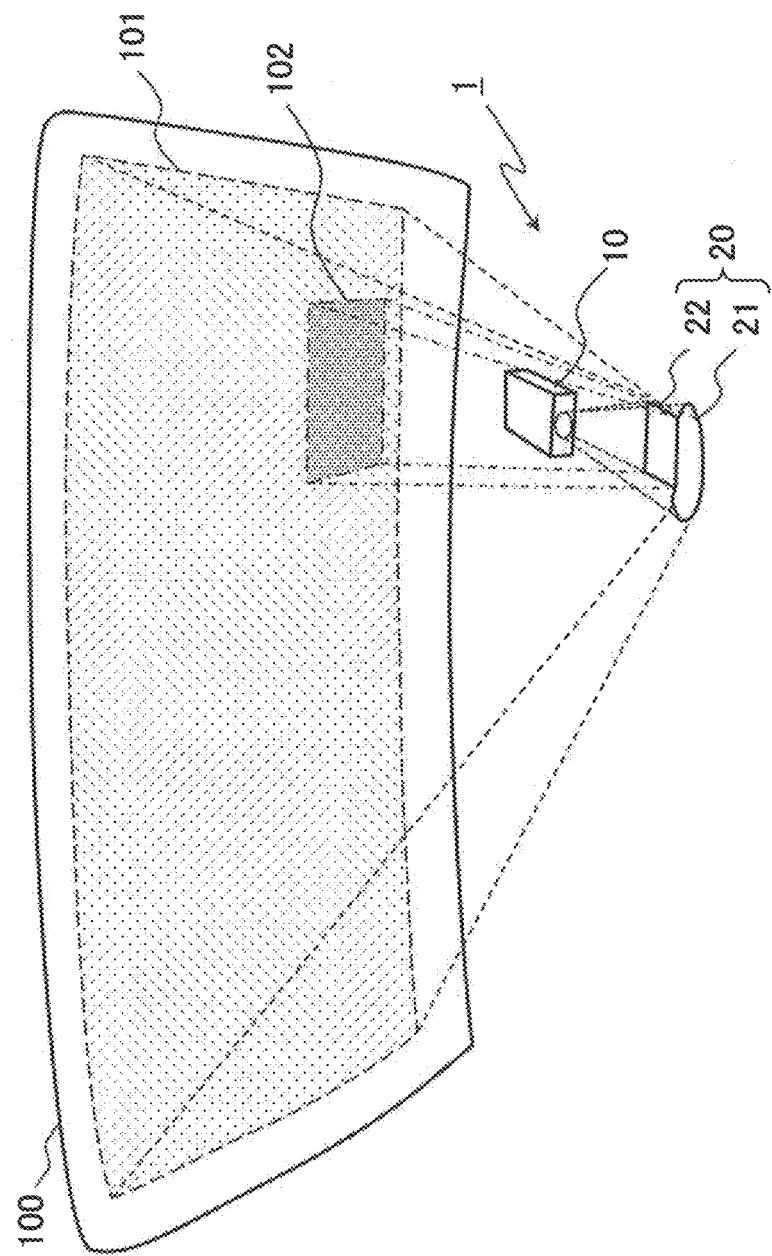
FIG. 1 is a conceptual view illustrating an application example of a display system according to a first example embodiment of the present invention.
Figure 2:
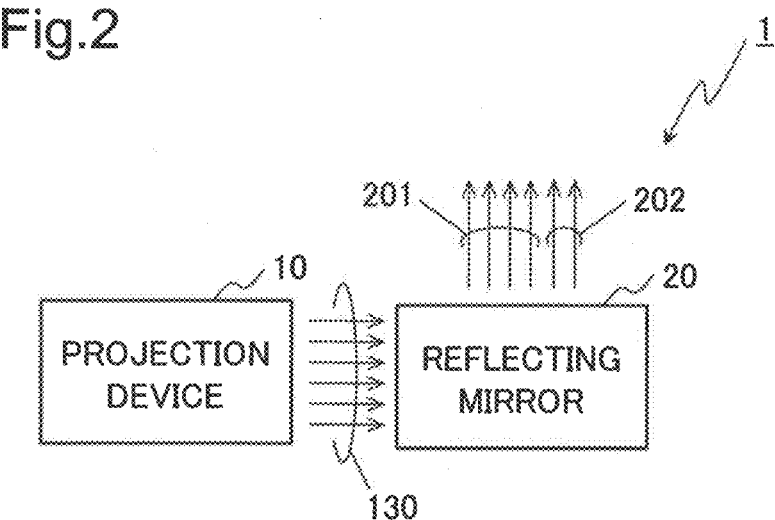
FIG. 2 is a conceptual diagram illustrating a configuration of the display system according to the first example embodiment of the present invention.

First, a display system according to a first example embodiment of the present invention is described by use of the drawings. FIG. 1 is a conceptual view illustrating an application example of a display system 1 according to the present example embodiment. FIG. 2 is a conceptual diagram illustrating a configuration of the display system 1 according to the present example embodiment. Note that, in the drawings referred to in the description below, a size, shape, positional relation, and the like of each component are conceptually illustrated, and do not accurately represent an actual size, shape, or positional relation.

As in FIGS. 1 and 2, the display system 1 according to the present example embodiment includes a projection device 10 and a reflecting mirror 20. Light projected from the projection device 10 is reflected by the reflecting mirror 20, and projected on a windshield 100 as projection light from the display system 1.

The windshield 100 reflects light reflected by the reflecting mirror 20, toward a driver who drives a vehicle such as an automobile. Note that, in the present example embodiment, a driver's seat is assumed to be on a right side of a vehicle. A film for projection light to be easily reflected may be attached to a surface of the windshield 100.

According to the display system 1 in the present example embodiment, a driver recognizes a real image seen through the windshield 100, and a virtual image reflected by the windshield 100, in a superimposed way. Thus, a driver utilizing the display system 1 visually recognizes virtual display information depending on a real image.

The display system 1 can be placed on a dashboard or a front panel of a vehicle. Alternatively, the display system 1 may be placed between a driver's seat and a passenger seat, behind a driver's seat, or near a rear seat. Alternatively, the display system 1 may be placed near a rearview mirror, a steering wheel, or the like.

The reflecting mirror 20 has at least two reflection surfaces including a first reflection surface and a second reflection surface. FIG. 1 illustrates an example in which the reflecting mirror 20 is configured by a first reflecting mirror 21 having a first reflection surface, and a second reflecting mirror 22 having a second reflection surface. Projection light 201 reflected by the first reflecting mirror 21 is projected toward a first display region 101 (also referred to as a first display region) of the windshield 100. By the second reflecting mirror 22, projection light 202 reflected by the reflecting mirror is projected toward a second display region 102 (also referred to as a second display region) of the windshield 100. The first display region 101 is a wide-ranging region over the entire windshield 100, and the second display region 102 is a narrow-ranging region being a part of the windshield 100.

In the present example embodiment, a low-accuracy image is projected to the first display region 101, and a high-accuracy image is projected to the second display region 102. In other words, a low-accuracy image projected to the first display region 101 is an image reflected by the first reflecting mirror 21, and a high-accuracy image projected to the second display region 102 is an image reflected by the second reflecting mirror 22.

In the present example embodiment, since a driver's seat is assumed to be on a right side, the second display region is configured to be located in a lower right part of the windshield 100 where a viewpoint of a driver tends to concentrate. Note that, when a driver's seat is not on a right side, a position where the second display region 102 is displayed needs only to be varied depending on a position of a driver's seat or a viewpoint of a driver.

The first reflecting mirror 21 and the second reflecting mirror 22 are preferably configured by materials having different shapes and properties. Note that, in FIG. 1, differences in shape and size are emphatically illustrated in order to emphasize a difference between the first reflecting mirror 21 and the second reflecting mirror 22.

For example, the first display region 101 targeted for projection by the first reflecting mirror 21 is wide-ranging, and therefore needs only to be configured by a mirror having great curvature. In contrast, the second display region 102 targeted for projection by the second reflecting mirror 22 is narrow-ranging, and therefore needs only to be configured by a mirror having small curvature. For example, it is possible to use a special lens having a free curved surface or a non-spherical surface for the first reflecting mirror 21, and use a general plane mirror for the second reflecting mirror 22. Actually, when projection light is projected on the windshield 100 from the display system 1, it is preferable to use a special lens having a free curved surface or a non-spherical surface for the second reflecting mirror 22 as well, in order to shorten a projection distance. In addition, a mirror less expensive than the second reflecting mirror 22 reflecting a high-accuracy image may be used for the first reflecting mirror 21 reflecting a low-accuracy image.

(Projection Device)

Figure 3:
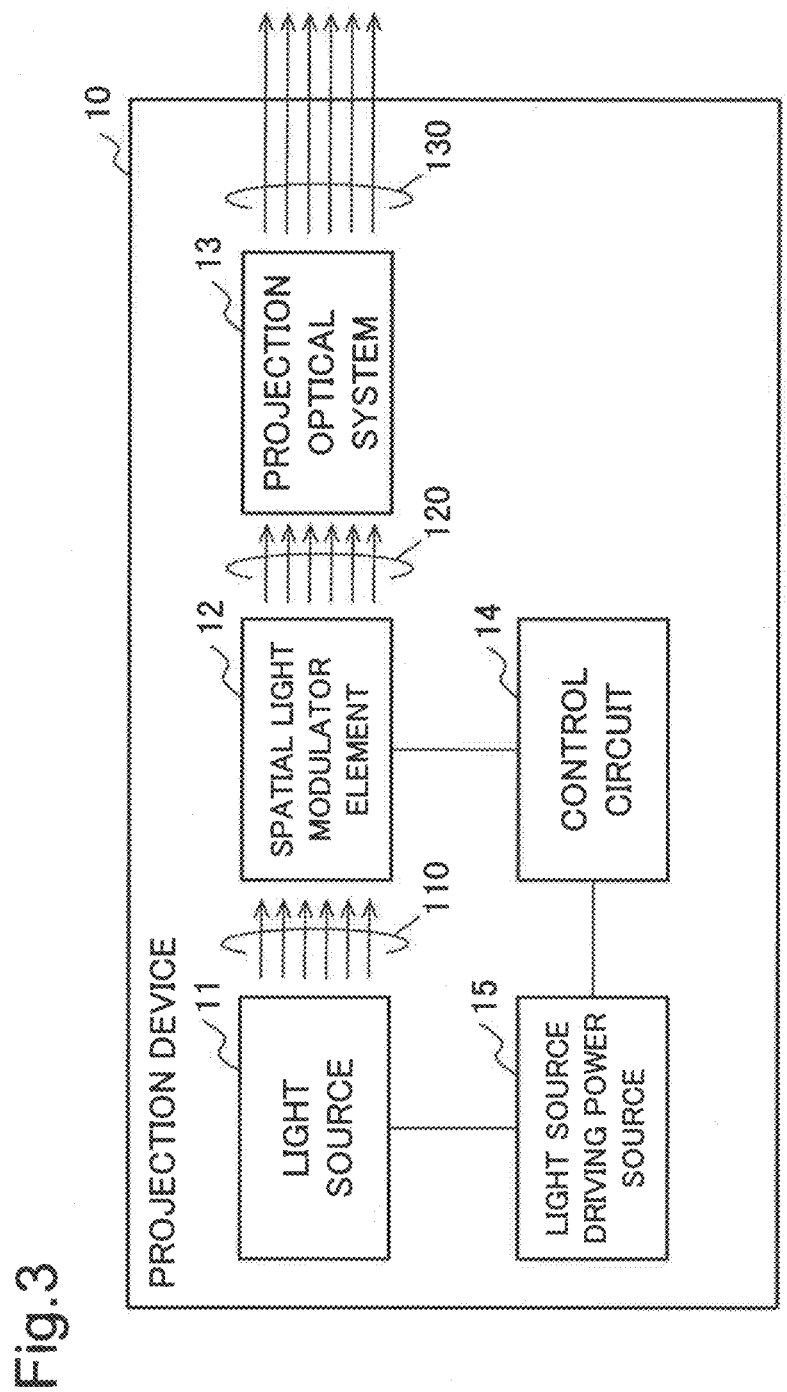
FIG. 3 is a conceptual diagram illustrating a configuration of a projection device of the display system according to the first example embodiment of the present invention.

Next, a configuration of the projection device 10 of the display system 1 is described in detail. FIG. 3 is a conceptual diagram illustrating a configuration of a projection device of the display system 1.

As in FIG. 3, the projection device 10 includes a light source 11, a spatial light modulator element 12, a projection optical system 13, a control circuit 14, and a light source driving power source 15. Note that, FIG. 3 is conceptual, and does not accurately represent a positional relation between respective components, a radiation direction of light, and the like.

The light source 11 emits light 110 having a particular wavelength. For example, a laser light source can be used for the light source 11. The light 110 emitted from the light source 11 is preferably in-phase coherent light. Normally, the light source 11 is configured to emit light in a visible region. Note that, the light source 11 may be configured to emit light in a region other than a visible region, such as an infrared region or an ultraviolet region. The light source 11 may also be a light source which emits light other than laser light, such as a light emitting diode, an incandescent light bulb, or a discharge tube.

For example, when the light source 11 is configured to emit light having a plurality of wavelengths, it is possible to vary a color of display information by changing a wavelength of light emitted from the light source 11. Moreover, when the light source 11 is configured to simultaneously emit light having different wavelengths, it is possible to display information composed of a plurality of colors.

The spatial light modulator element 12 displays, on a display part thereof, a pattern for generating display information to be displayed in each display region, depending on control of the control circuit 14. In the present example embodiment, in a state where a predetermined pattern is displayed on the display part of the spatial light modulator element 12, the light 110 is radiated to the display part. The spatial light modulator element 12 emits, toward the projection optical system 13, modulation light 120 in which the light 110 is modulated.

In the present example embodiment, a pattern for producing a display image on a projection target surface with differing accuracy is displayed on the display part of the spatial light modulator element 12. A phase distribution (also referred to as a first pattern) corresponding to display information to be displayed in the first display region 101, and a phase distribution (also referred to as a second pattern) corresponding to display information to be displayed in the second display region 102 are displayed on the display part of the spatial light modulator element 12.

The spatial light modulator element 12 can be achieved by a phase-modulation-type spatial light modulator element which receives entrance of the in-phase coherent light 110, and modulates a phase of the entering light 110. The phase-modulation-type spatial light modulator element 12 is focus-free, and therefore does not need to change focus from distance to distance even when light is projected to display regions set at a plurality of projection distances. Note that, the spatial light modulator element 12 may be an element of a type different from a phase modulation type as long as the spatial light modulator element 12 is able to display display information in each display region. The spatial light modulator element 12 is described below as being a phase-modulation-type element.

A phase distribution of display information to be displayed in each display region is displayed on the display part of the phase-modulation-type spatial light modulator element 12. In this case, modulation light 120 reflected in the display region of the spatial light modulator element 12 becomes such an image of a kind in which a diffraction grating forms an aggregate, and display information is formed in such a way that light diffracted by a diffraction grating are collected.

The spatial light modulator element 12 is achieved by, for example, a spatial light modulator element using ferroelectric liquid crystal, homogeneous liquid crystal, vertical alignment liquid crystal, or the like. Specifically, the spatial light modulator element 12 can be achieved by liquid crystal on silicon (LCOS). Alternatively, the spatial light modulator element 12 may be achieved by, for example, a micro electro mechanical system (MEMS).

When the phase-modulation-type spatial light modulator element 12 is used, energy can be concentrated on a part of display information by sequentially switching a region in which projection light is projected. Thus, according to the phase modulation type, it is possible to display display information more brightly than that by a type which projects light in the entire display region, as long as output of a light source is the same.

The projection optical system 13 is an optical system which projects, as projection light 130, the modulation light 120 modulated by the spatial light modulator element 12. The modulation light 120 modulated by the spatial light modulator element 12 is projected by the projection optical system 13 as the projection light 130.

The control circuit 14 is a circuit which performs control of displaying, on the display part of the spatial light modulator element 12, a pattern for generating display information to be displayed in each display region, and driving the light source driving power source 15. The control circuit 14 controls to display, on the display part of the spatial light modulator element 12, a phase distribution (also referred to as a first pattern) corresponding to display information to be displayed in the first display region 101. The control circuit 14 also controls to display, on the display part of the spatial light modulator element 12, a phase distribution (also referred to as a second pattern) corresponding to display information to be displayed in the second display region 102.

Furthermore, the control circuit 14 controls emission timing and output of the light 110 from the light source 11, by controlling the light source driving power source 15.

The light source driving power source 15 is a power source serving to drive the light source 11 depending on control of the control circuit 14, and thus emit the light 110 from the light source 11.

(Projection Optical System)

Figure 4:
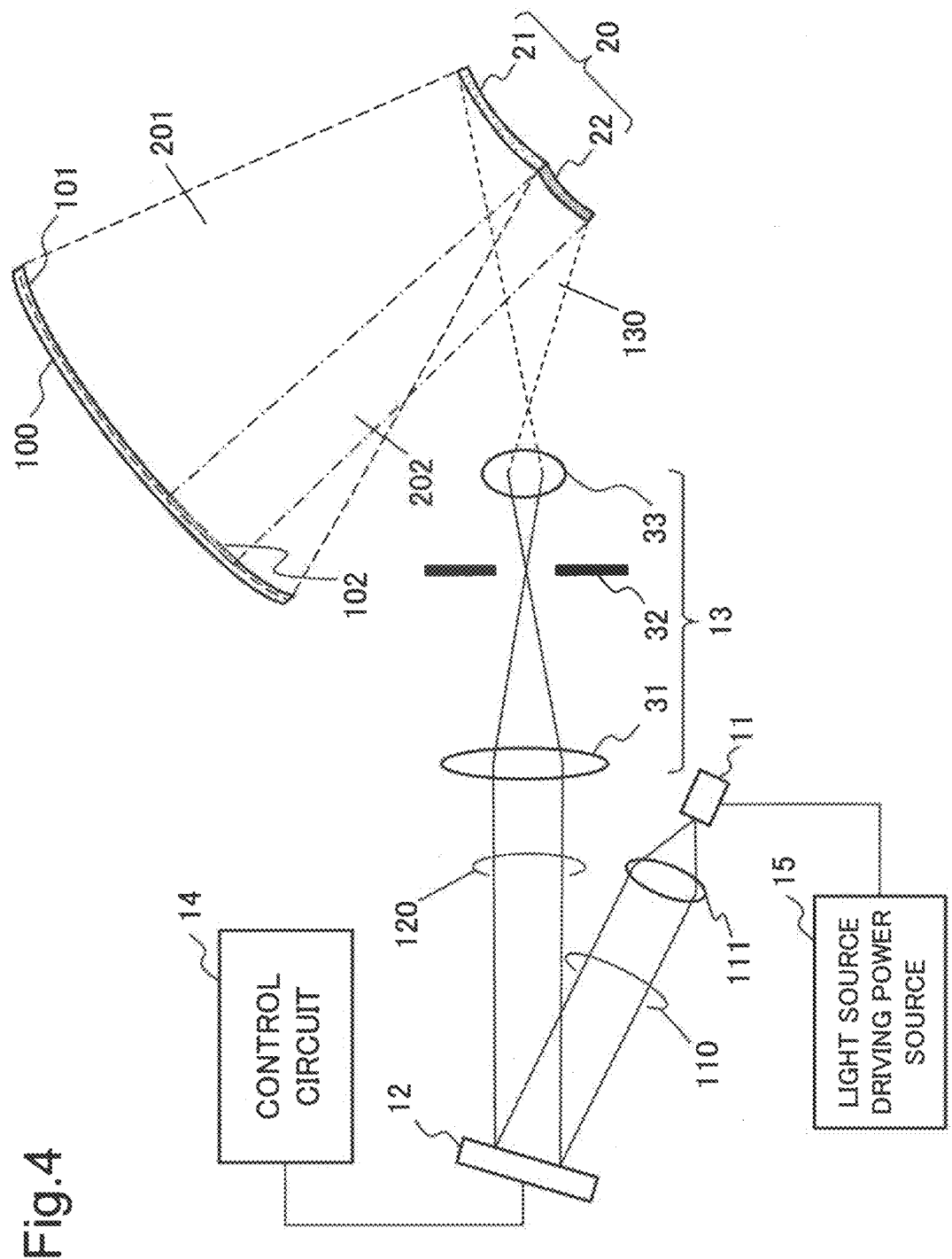
FIG. 4 is a conceptual diagram illustrating a configuration of an optical system of the display system according to the first example embodiment of the present invention.

Next, details of the projection optical system 13 of the projection device 10 are described by use of FIG. 4.

FIG. 4 is a conceptual diagram including a configuration of the projection optical system 13 of the projection device 10. In FIG. 4, light emitted from the light source 11 is converted into the in-phase light 110 by a collimator 111. As in FIG. 4, the projection optical system 13 includes a Fourier transform lens 31, an aperture 32, and a projection lens 33.

The Fourier transform lens 31 is an optical lens serving to produce, on a near focus, an image formed when the modulation light 120 reflected by the display part of the spatial light modulator element 12 is projected at infinity. In FIG. 4, focus is formed at a position of the aperture 32.

The aperture 32 has a function of blocking high-order light included in light collected by the Fourier transform lens 31, and specifying a display region. An opening of the aperture 32 is opened smaller than an outermost periphery of a display region at the position of the aperture 32, and placed in such a way to block a peripheral region of display information at the position of the aperture 32. For example, the opening of the aperture 32 is formed into a rectangular shape or a circular shape. The aperture 32 is preferably placed at a focus position of the Fourier transform lens 31, but may be out of the focus position as long as the aperture 32 is able to exert a function of erasing high-order light.

The projection lens 33 is an optical lens which magnifies and then projects light collected by the Fourier transform lens 31. The projection lens 33 projects the projection light 130 toward the reflecting mirror 20 in such a way that display information corresponding to a phase distribution input to the spatial light modulator element 12 is displayed in each display region.

When the display system 1 is used for a purpose of projecting a line drawing such as a simple mark, the projection light 130 projected from the projection optical system 13 is not projected evenly in each display region, but is projected concentratedly in a part such as a character, a sign, or a frame constituting display information. In such a case, according to the display system 1, an emission amount of the light 110 can be substantially reduced, and therefore, overall light output can be suppressed. In other words, the display system 1 can be configured by the small-sized and low-power light source 11, can therefore lower output of the light source driving power source 15 which drives the light source 11, and can reduce overall power consumption.

In the example of FIG. 4, the reflecting mirror 20 is disposed at a position where the projection light 130 projected from the projection lens 33 is produced into an image. Magnification of reflection light by the second reflecting mirror 22 is less than magnification of reflection light by the first reflecting mirror 21.

A component (hereinafter, a first component) of the projection light 130 projected toward the reflection surface of the first reflecting mirror 21 is projected to the first display region 101 as the projection light 201. An image formed by the projection light 201 projected to the first display region 101 is low in accuracy.

A component (hereinafter, a second component) of the projection light 130 projected toward the reflection surface of the second reflecting mirror 22 is projected to the second display region 102 as the projection light 202. An image formed by the projection light 202 projected to the second display region 102 is high in accuracy.

In the example of FIG. 4, an entrance angle of the light 110 is made non-perpendicular to the display part of the spatial light modulator element 12. In other words, in the present example embodiment, an emission axis of the light 110 from the light source 11 is made oblique to the display part of the spatial light modulator element 12. When the emission axis of the light 110 is set to be oblique to the display part of the spatial light modulator element 12, the light 110 can enter the display part of the spatial light modulator element 12 without using a beam splitter, and therefore, efficiency improves.

Practically, it is necessary to remove 0-th light included in the projection light 130. Thus, a mechanism for removing 0-th light from the projection light 130 is required.

Figure 5:
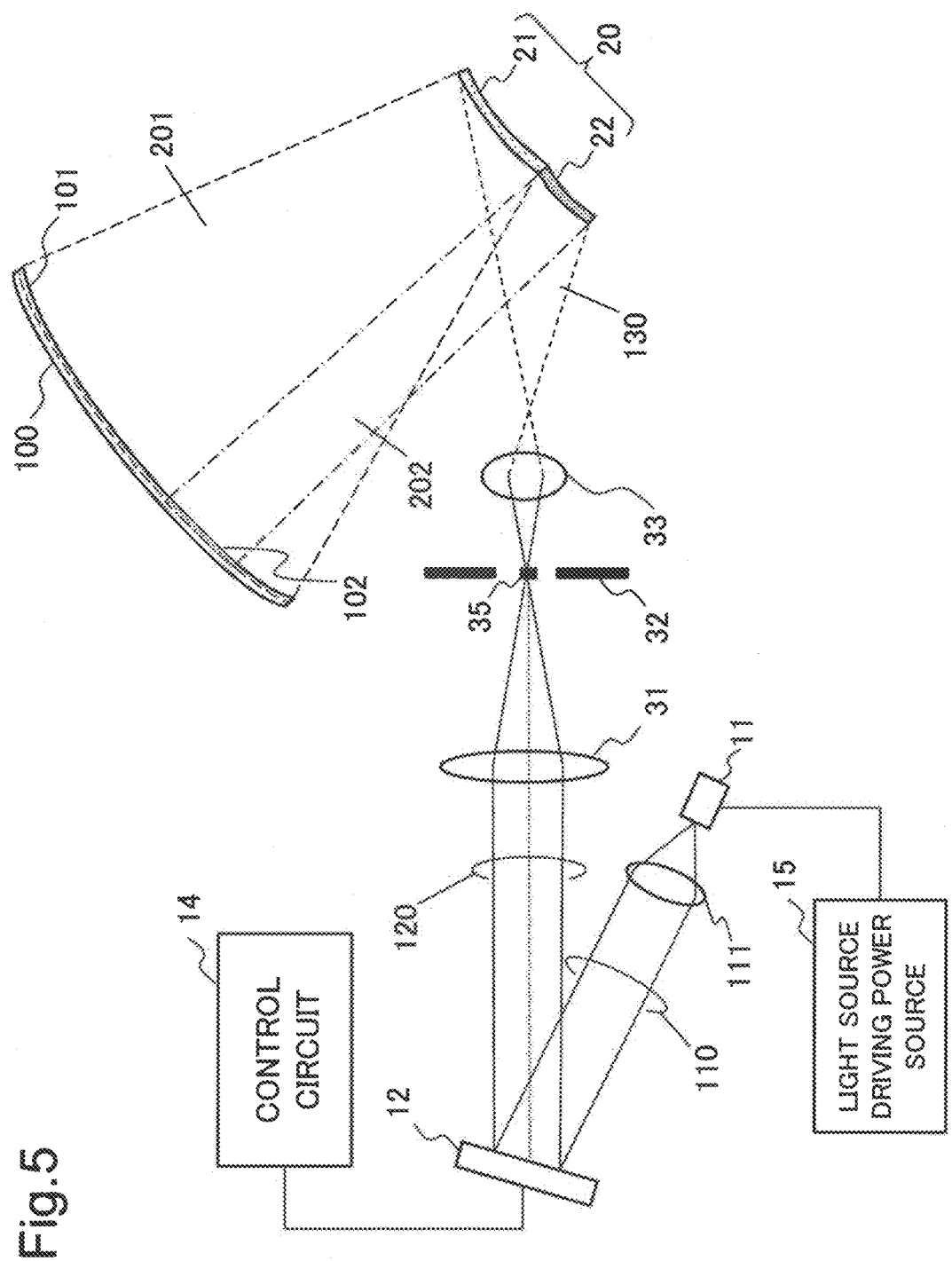
FIG. 5 is a conceptual diagram illustrating another configuration of an optical system of the display system according to the first example embodiment of the present invention.

FIG. 5 is a configuration example of removing 0-th light at a place of the aperture 32. In the example of FIG. 5, a light absorption member 35 is disposed on an optical path of 0-th light in the opening of the aperture. The light absorption member 35 needs only to be fixed to the aperture by a transparent member.

Figure 6:
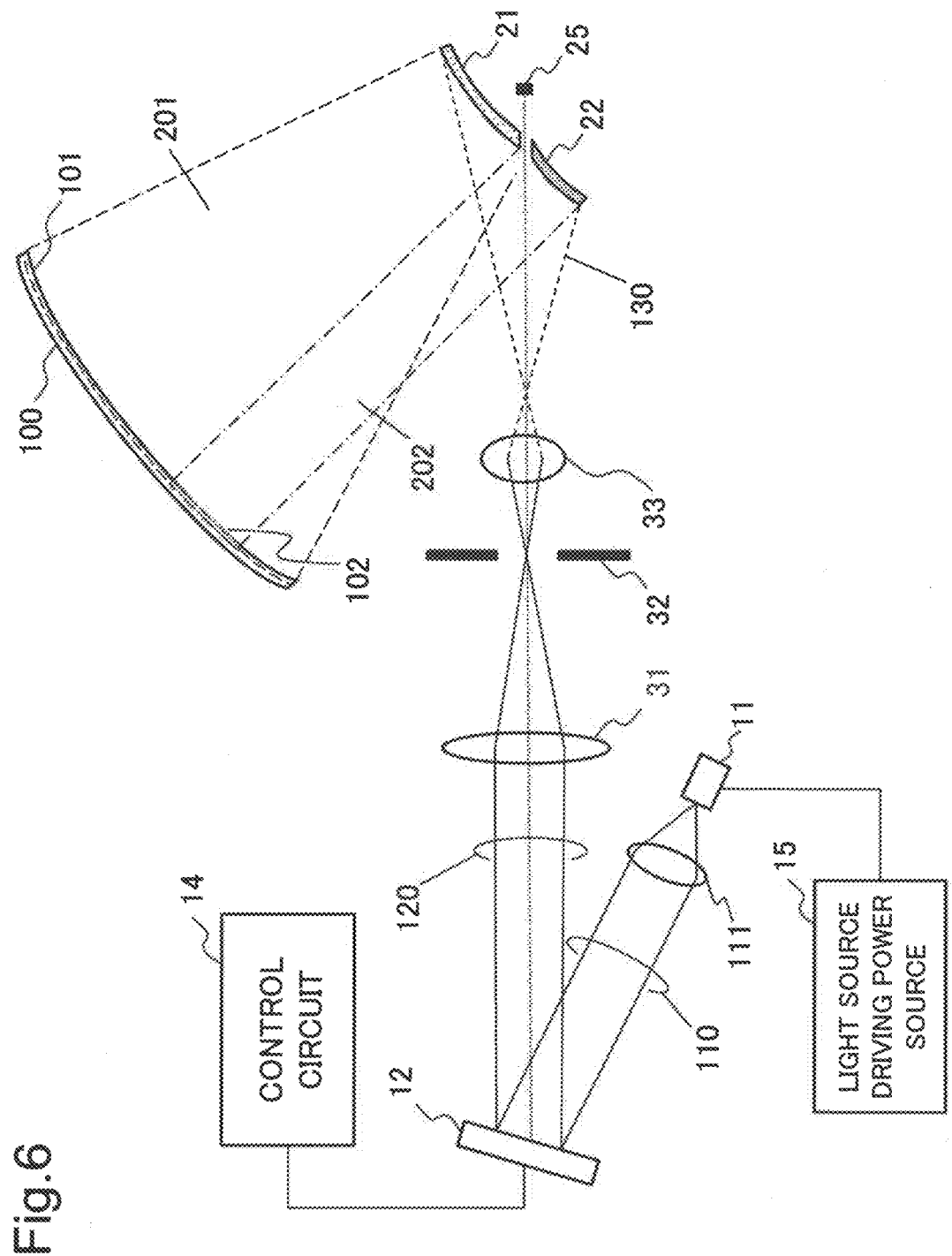
FIG. 6 is a conceptual diagram illustrating still another configuration of an optical system of the display system according to the first example embodiment of the present invention.

FIG. 6 is a configuration example in which a clearance is provided between the first reflecting mirror 21 and the second reflecting mirror 22, and 0-th light is passed through the clearance. Although the first reflecting mirror 21 and the second reflecting mirror 22 are illustrated in such a way as to be disposed apart from each other in the example of FIG. 6, a clearance needs only to be provided in a part corresponding to an optical path of 0-th light in actuality. 0-th light passing through the clearance between the first reflecting mirror 21 and the second reflecting mirror 22 needs only to be absorbed by the light absorption member 25.

With the above-described configurations as in FIGS. 5 and 6, 0-th light from the projection light 130 can be removed. Note that, FIGS. 5 and 6 are examples only, and a mechanism of removing 0-th light is not limited to the mechanism cited herein.

(Control Circuit)

Figure 7:
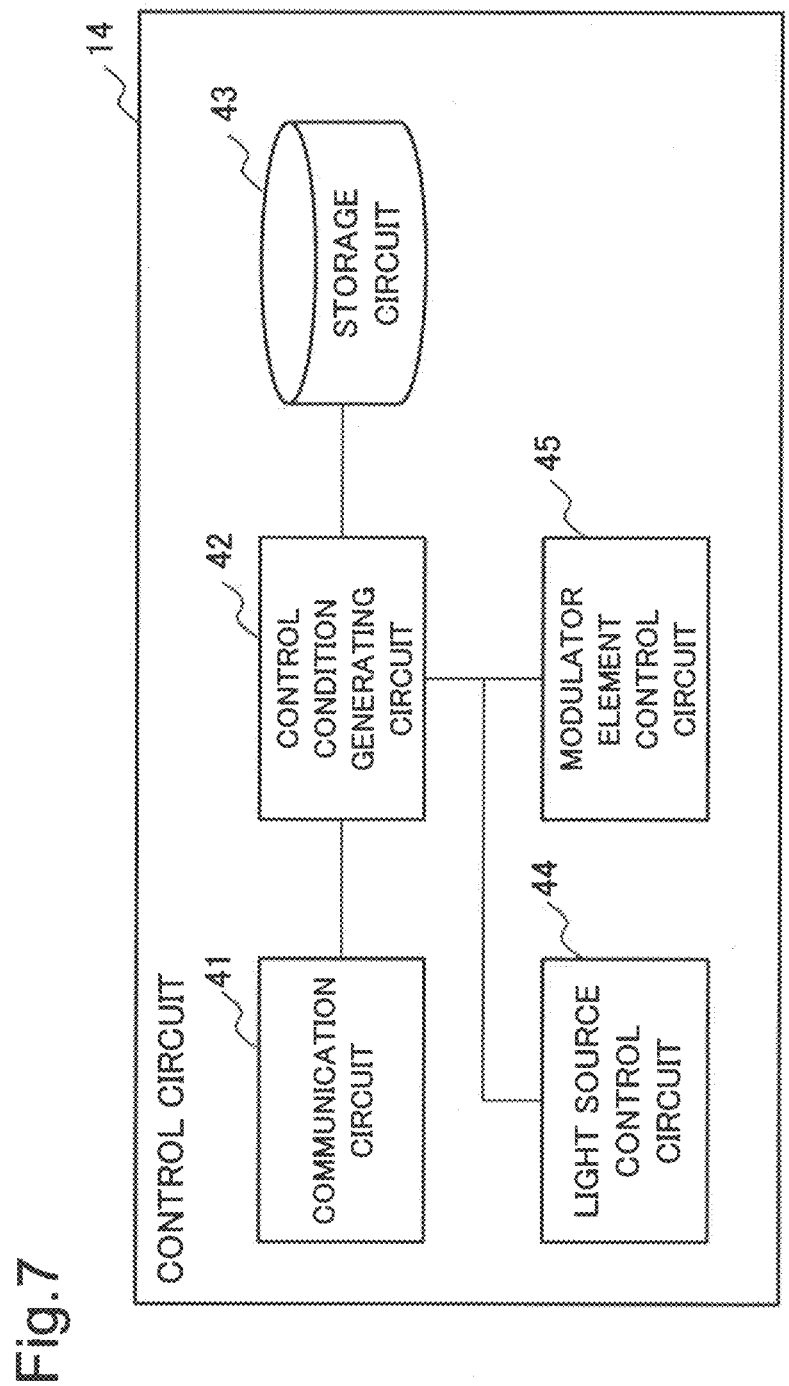
FIG. 7 is a block diagram illustrating a configuration of a control circuit of the display system according to the first example embodiment of the present invention.

Next, the control circuit 14 is described in detail. FIG. 7 is a block diagram illustrating a configuration of the control circuit 14 of the display system 1. As in FIG. 7, the control circuit 14 includes a communication circuit 41, a control condition generating circuit 42, a storage circuit 43, a light source control circuit 44, and a modulator element control circuit 45.

The communication circuit 41 is an interface which connects another system, device, sensor, or the like in a vehicle to the display system 1. The communication circuit 41 acquires information about display information to be displayed on the display system 1, from another system, device, sensor, or the like in a vehicle. For example, the communication circuit 41 acquires information about a running car or a road, and the like. The communication circuit 41 outputs the acquired information to the control condition generating circuit 42.

Based on the information acquired from the communication circuit 41, the control condition generating circuit 42 acquires, from the storage circuit 43, a basic pattern constituting a pattern for displaying display information in each display region. The control condition generating circuit 42 generates a pattern to be displayed on the display part of the spatial light modulator element 12, by moving and synthesizing the basic pattern stored in the storage circuit 43. Note that, when the spatial light modulator element 12 is configured by a phase-modulation-type element, a pattern to be displayed on the display part of the spatial light modulator element 12 is a phase distribution corresponding to the display information.

The control condition generating circuit 42 generates a control condition for projecting appropriate display information toward an appropriate display region at appropriate timing. A control condition includes a modulator element control condition for projecting an appropriate pattern toward an appropriate display region, and a light source control condition for projecting at appropriate timing. The control condition generating circuit 42 outputs the modulator element control condition to the modulator element control circuit 45, and outputs the light source control condition to the light source control circuit 44.

Furthermore, the control condition generating circuit 42 edits a pattern in such a way that display information to be displayed in the first display region 101 is projected toward the first reflecting mirror 21, and display information to be displayed in the second display region 102 is projected toward the second reflecting mirror 22.

Figure 8:
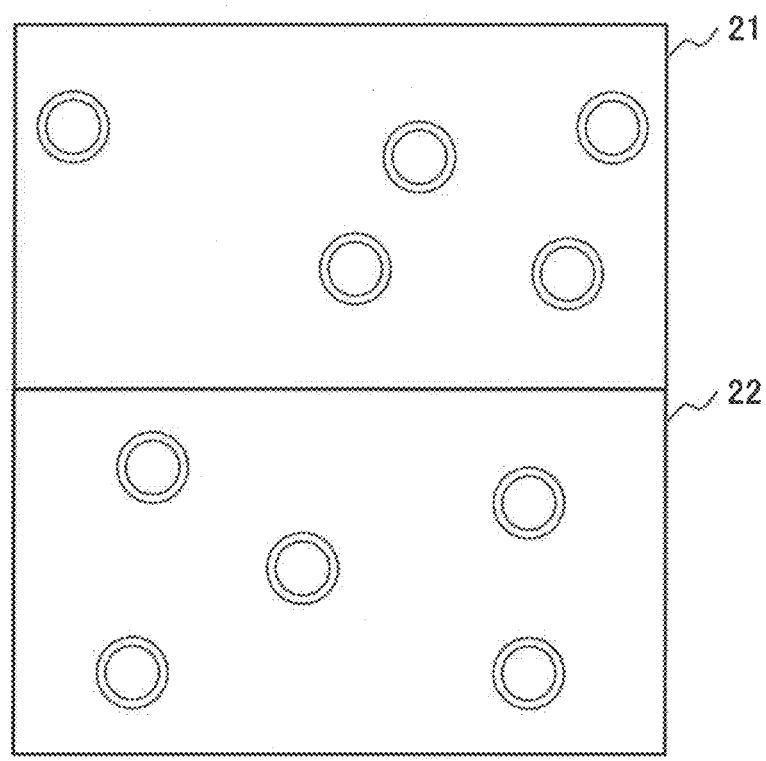
FIG. 8 is a conceptual diagram illustrating one example of display information projected by a reflecting mirror of the display system according to the first example embodiment of the present invention.

FIG. 8 is a conceptual diagram illustrating one example of display information (outlined circle) projected on the reflecting mirror 20. Display information to be displayed in the first display region 101 is projected to the first reflecting mirror 21, and display information to be displayed in the second display region 102 is projected to the second reflecting mirror 22. At a position of the reflecting mirror 20, it is not necessary to change a definition degree of display information projected to the first reflecting mirror 21 and the second reflecting mirror 22. However, the control condition generating circuit 42 may generate such a control condition that display information projected to the first reflecting mirror 21 has a low definition degree, and display information projected to the second reflecting mirror 22 has a high definition degree. Note that FIG. 8 conceptually illustrates that display information to be displayed in the first display region 101 is reflected to the first reflecting mirror 21, and display information to be displayed in the second display region 102 is reflected to the second reflecting mirror 22. Thus, FIG. 8 does not necessarily represent sizes of the first reflecting mirror 21 and the second reflecting mirror 22 accurately.

Figure 9:
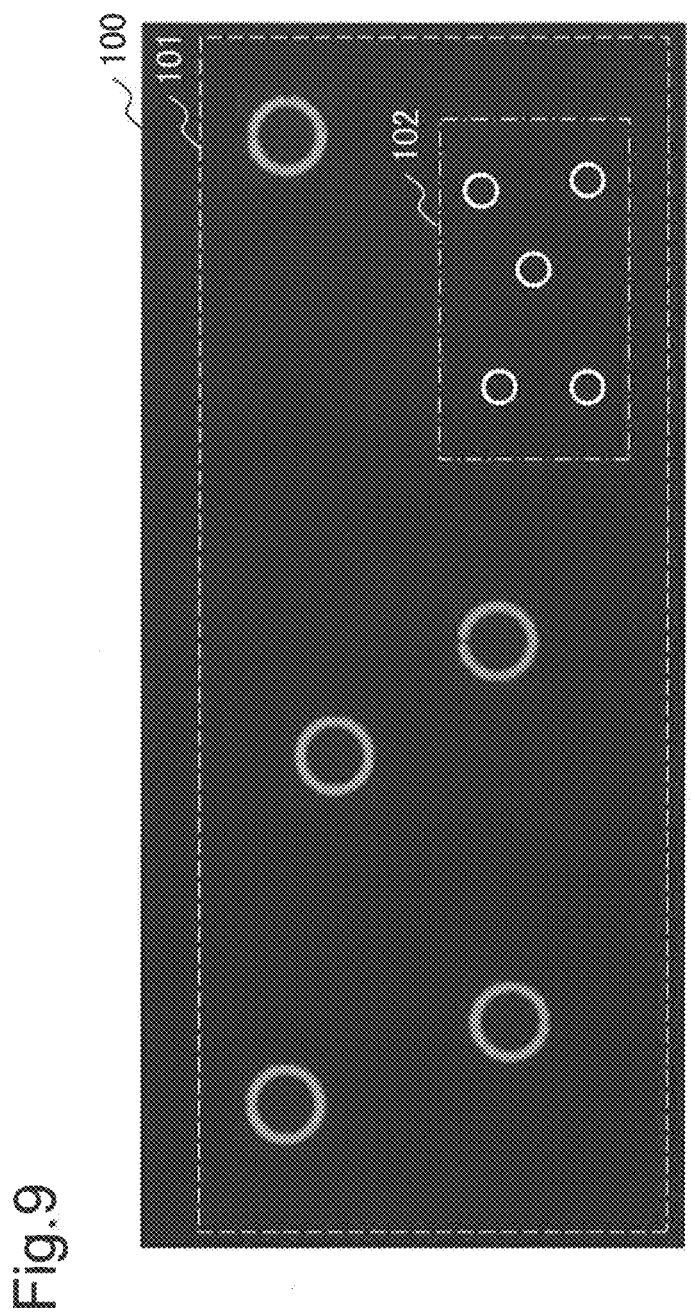
FIG. 9 is a conceptual diagram illustrating one example of display information displayed in each display region by the display system according to the first example embodiment of the present invention.

FIG. 9 is a conceptual diagram illustrating one example in which display information (outlined circle) projected on the reflecting mirror 20 as in FIG. 8 is displayed on the windshield 100. At a stage of being displayed on the windshield 100, display information to be displayed in the first display region 101 and display information to be displayed in the second display region 102 have different definition degrees. While display information to be displayed in the first display region 101 has low definition, display information to be displayed in the second display region 102 has high definition. Since light reflected to the first reflecting mirror 21 is projected to the wide-ranging first display region 101 at a wide projection angle, light is diffused, and thus, a definition degree becomes low. In contrast, since light reflected to the second reflecting mirror 22 is projected to the narrow-ranging second display region 102 at a narrow projection angle, light is not diffused, and thus, a definition degree becomes high. However, FIG. 9 exaggeratedly illustrates a difference of display information, and therefore, does not necessarily represent actually displayed display information.

In a projection device which is not a phase modulation type, a focus position differs depending on a distance between the projection device and a projection target surface, and therefore, it is difficult to set in such a way as to display low-definition display information in a low-definition display region and display high-definition display information in a high-definition display region. In contrast, in the present example embodiment, since a focus-free phase-modulation-type projection optical system is used, focus is determined even when a distance between the projection device and a projection target surface differs, and therefore, it is possible to easily set a low-definition display region and a high-definition display region.

A basic pattern constituting a pattern for displaying desired display information in each display region is stored in the storage circuit 43. For example, a basic pattern for generating display information needs only to be previously stored in the storage circuit 43. Note that, not only the basic pattern, but also a pattern in which basic patterns are combined, and a more complicated pattern may be stored in the storage circuit 43.

A pattern corresponding to information acquired by the control condition generating circuit 42 is stored in the storage circuit 43.

For example, the display system 1 acquires a running speed of a vehicle from another system, and displays the running speed in the second display region 102. In this case, patterns corresponding to numbers 0 to 9 need only to be stored in the storage circuit 43. When acquiring a running speed of a vehicle, the control condition generating circuit 42 acquires, from the storage circuit 43, a pattern corresponding to a number included in the running speed. Then, the control condition generating circuit 42 needs only to generate a control condition which displays the pattern itself or a combination on the display part of the spatial light modulator element 12.

For example, the display system 1 displays, in the second display region, a sign on a road where a vehicle is running. In this case, a pattern corresponding to a road sign to be displayed needs only to be stored in the storage circuit 43 in association with positional information or the like. The control condition generating circuit 42 acquires, from a global positioning system (GPS) or a sensor, a position where a vehicle is running, and acquires, from the storage circuit 43, a pattern corresponding to a road sign associated with the position. Then, the control condition generating circuit 42 needs only to generate a control condition which displays the acquired pattern on the display part of the spatial light modulator element 12. Note that any road sign to be displayed needs only to be set with respect to a regulation such as a speed limit or parking prohibition.

For example, the display system 1 displays, in the second display region, display information associated with a navigation system. In this case, a pattern corresponding to display information used in the navigation system needs only to be stored in the storage circuit 43 in association with positional information or the like. The control condition generating circuit 42 acquires, from a GPS or a sensor, a position of a running vehicle, and acquires, from the storage circuit 43, a pattern corresponding to navigation information associated with the position of the vehicle. Then, the control condition generating circuit 42 needs only to generate a control condition which displays the acquired pattern on the display part of the spatial light modulator element 12.

In addition, when a pattern corresponding to display information about another system, device, or sensor, mounted in a vehicle is stored in the storage circuit 43, the display system 1 can display display information about any system, device, or sensor.

Furthermore, the display system 1 may display sign information about a road where a vehicle is running. For example, the display system 1 needs only to display sign information about a hazard warning sign, a priority sign, a prohibition and restriction sign, a special regulation sign, an information/facility/service sign, a direction/position/instruction sign, an additional display panel, or the like.

The display system 1 may display a warning light informing a passenger of an abnormality of a vehicle. For example, the display system 1 needs only to display an antilock brake system (ABS) warning light, an automatic transmission (AT) warning light, a fuel filter warning light, an engine warning light, a brake warning light, an exhaust temperature warning light, a water temperature warning light, a fuel warning light, or the like. Moreover, for example, the display system 1 may display an air bag warning light, a seat belt warning light, a washer fluid warning light, a security warning light, a charging warning light, an oil pressure warning light, a door warning light, or the like. Further, for a hybrid vehicle or an electric vehicle, the display system 1 may display a warning light such as an electric vehicle (EV) system warning light, a battery remaining capacity warning light, or an output restriction indication light.

The light source control circuit 44 controls on/off and driving voltage of the light source driving power source 15, based on the light source control condition acquired from the control condition generating circuit 42. The light source driving power source 15 complies with control of the light source control circuit 44, and thereby, it is possible to display an appropriate display pattern in each display region.

The modulator element control circuit 45 displays, on the display part of the spatial light modulator element 12, a pattern for generating display information to be displayed in each display region. For example, when driving a phase-modulation-type element, the modulator element control circuit 45 drives the spatial light modulator element 12 in such a way that a parameter which determines a difference between a phase of the light 110 radiated to the display part of the spatial light modulator element 12 and a phase of the modulation light 120 reflected by the display part changes.

A parameter which determines a difference between a phase of the light 110 radiated to the display part of the phase-modulation-type spatial light modulator element 12 and a phase of the modulation light 120 reflected by the display part is, for example, a parameter regarding an optical characteristic such as a refractive index or an optical path length. For example, the modulator element control circuit 45 changes a refractive index of the display part by changing voltage applied to the display part of the spatial light modulator element 12. As a result, the light 110 radiated to the display part is suitably diffracted, based on the refractive index of the display part. In other words, a phase distribution of the light 110 radiated to the phase-modulation-type spatial light modulator element 12 is modulated depending on an optical characteristic of the display part. Note that a method of driving the spatial light modulator element 12 by the modulator element control circuit 45 is not limited to the method cited herein.

(Hardware)

Figure 10:
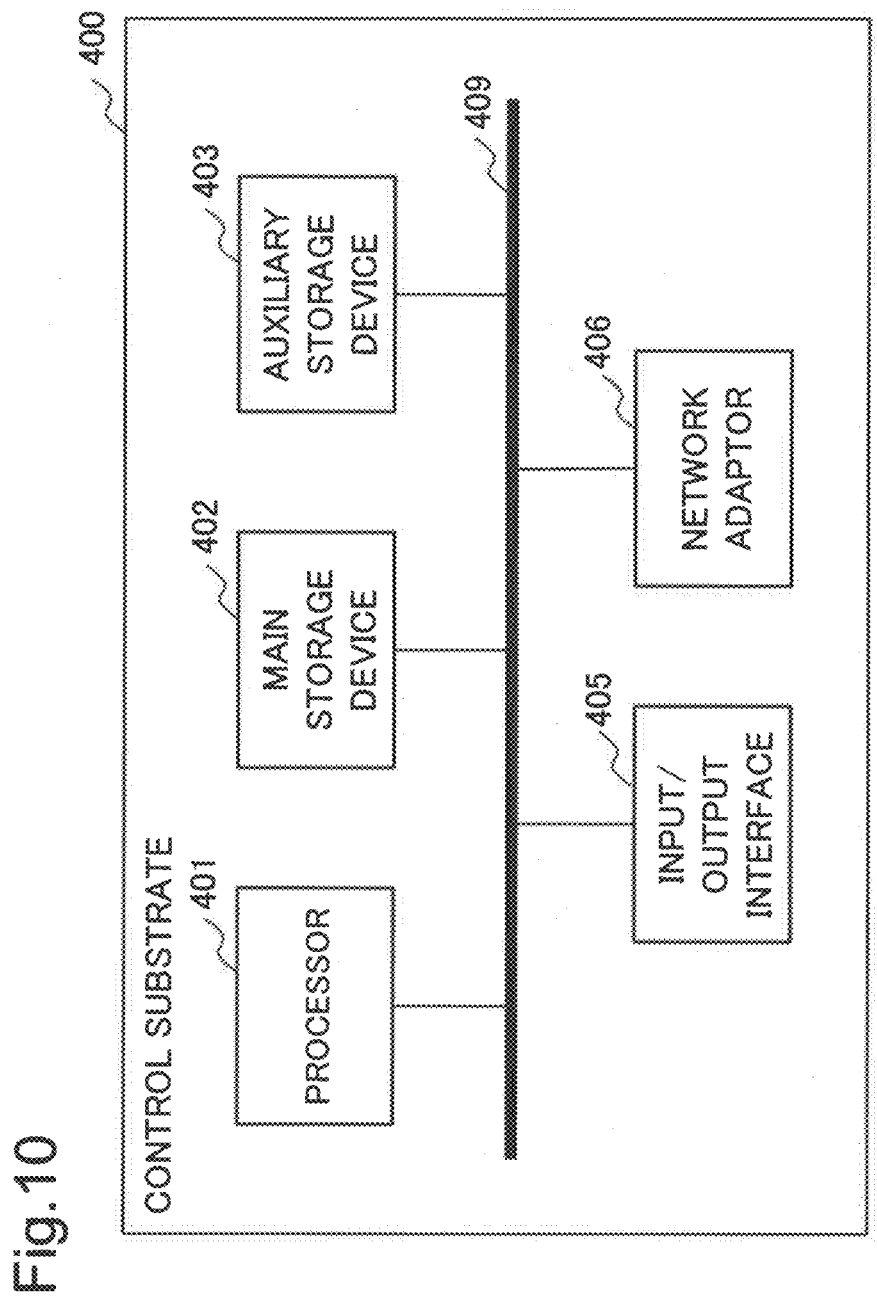
FIG. 10 is a block diagram illustrating one example of a hardware configuration which achieves the control circuit of the display system according to the first example embodiment of the present invention.

Herein, hardware (a control substrate 400) which achieves a control system of the display system 1 according to the present example embodiment is described by use of FIG. 10. Note that, the control substrate 400 in FIG. 10 is one example of achieving the display system 1 according to the present example embodiment, and does not limit the scope of the present invention.

As in FIG. 10, the control substrate 400 includes a processor 401, a main storage device 402, an auxiliary storage device 403, an input/output interface 405, and a network adaptor 406. Note that, in FIG. 10, an interface is abbreviated as an I/F. The processor 401, the main storage device 402, the auxiliary storage device 403, the input/output interface 405, and the network adaptor 406 are connected to one another via a bus 409. Moreover, the processor 401, the main storage device 402, the auxiliary storage device 403, and the input/output interface 405 are connected to a network such as an intranet or the Internet via the network adaptor 406. The control substrate 400 is connected to another system, device, or sensor via a network. Further, the control substrate 400 may be connected to an upper system or server via a wireless network.

The processor 401 is a central processing unit which develops, in the main storage device 402, a program saved in the auxiliary storage device 403 or the like, and executes the developed program. In the present example embodiment, the processor 401 needs only to be configured to use a software program installed on the control substrate 400. The processor 401 executes arithmetic processing or control processing by the control circuit 14.

The main storage device 402 has a region where a program is developed. The main storage device 402 needs only to be a nonvolatile memory such as a dynamic random access memory (DRAM). Alternatively, a nonvolatile memory such as a magnetoresistive random access memory (MRAM) may be configured and added as the main storage device 402.

The auxiliary storage device 403 is a means for storing data such as a phase distribution of display information. The auxiliary storage device 403 is configured as a local disk such as a hard disk or a flash memory. Note that, it is possible to configure in such a way that data are stored in the main storage device 402, and omit the auxiliary storage device 403.

The input/output interface 405 is a device which connects the control substrate 400 to peripheral equipment, based on a connection standard.

The control substrate 400 may be configured in such a way that input equipment such as a keyboard, a mouse, or a touch panel can be connected to the control substrate 400 as needed. Such input equipment is used for input of information and setting. Note that, when a touch panel is used as input equipment, the touch panel needs only to be a touch panel display in which a display screen of display equipment doubles as an interface of input equipment. Exchange of data between the processor 401 and input equipment may be mediated by the input/output interface 405.

The network adaptor 406 is an interface for connecting to a network such as an intranet or the Internet, based on a standard or a specification. The input/output interface 405 and the network adaptor 406 may be formed into a common interface connecting to external equipment.

The display system 1 is connected to another system, device, sensor, or the like via the input/output interface 405 and the network adaptor 406. For example, the display system 1 is connected to a system, device, or sensor serving for engine control, chassis control, safety and comfort control, and communication.

For example, the display system 1 is connected to a navigation system, a speed measurement device, a vehicle approach reporting device, a headlight, a drive recorder, an in-vehicle camera, an air bag, an audio device, a radio, a speaker, and the like. The display system 1 is also connected to an airflow meter, a vacuum sensor, various gas sensors, an oil temperature sensor, a knock sensor, a steering sensor, a vehicle speed sensor, a yaw rate sensor, a sensor for an air bag, an ultrasonic sensor, a radar sensor, and the like. The display system 1 is also connected to, for example, an accelerator position sensor, a slot position sensor, a crank position sensor, a cam position sensor, a vehicle height control sensor, a torque sensor for electric power steering, a tire air pressure sensor, a temperature sensor for engine control, and the like.

As described above, according to the display system in the present example embodiment, display information formed by a single pattern displayed on a display part of a spatial light modulator element can be displayed in different display regions by being reflected by two reflecting mirrors having different reflection characteristics. In other words, according to the display system in the present example embodiment, pieces of display information having different definition degrees are displayed in different display regions on a same projection target surface, and therefore, it is possible to display, with high definition and low power, display information visually recognized by a user.

Furthermore, in the display system according to the present example embodiment, it is possible to set a position where display information is displayed, without using a movable part, by using a phase-modulation-type spatial light modulator element. Thus, in a case of an in-vehicle purpose, blurring of display information is less apt to occur as compared with a case where a movable part is present. In other words, according to the display system in the present example embodiment, it is possible to provide a display system which displays a high-definition image with low power, without providing a movable part.

Modification Example

Figure 11:
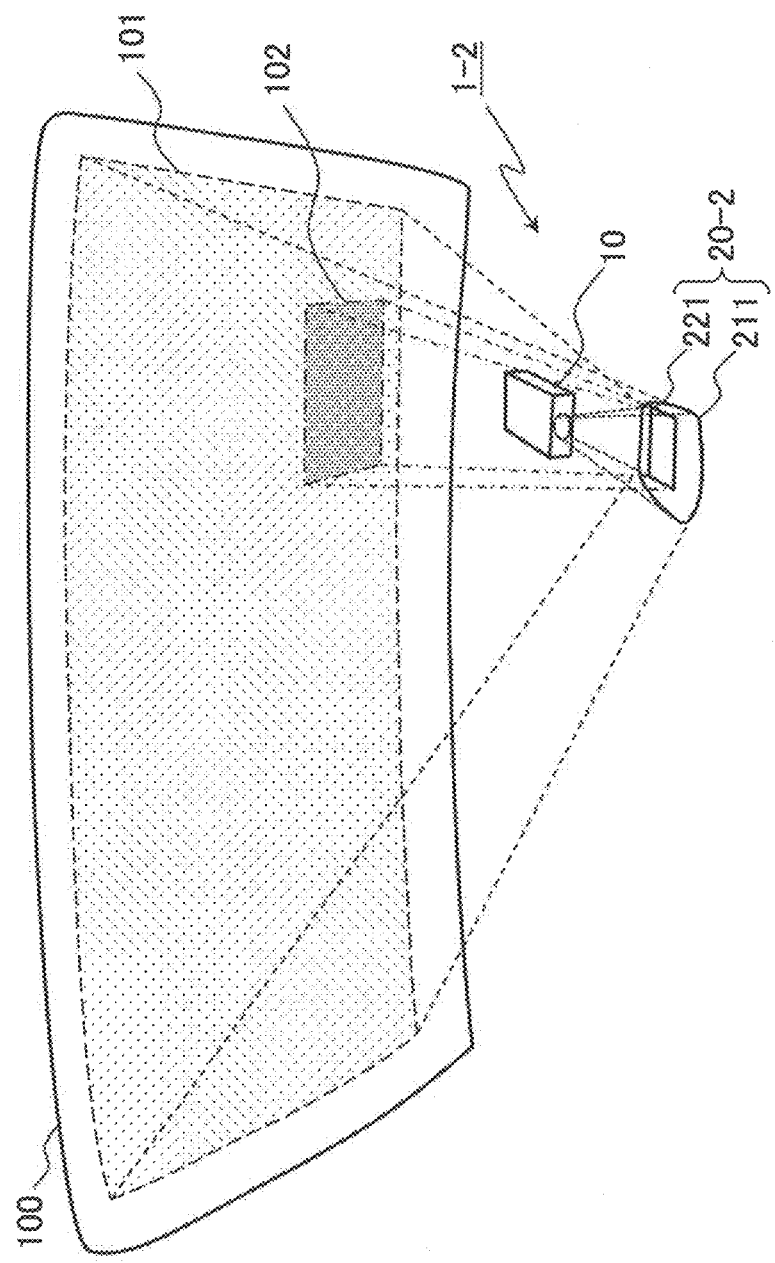
FIG. 11 is a conceptual view illustrating an application example of a display system according to a modification example of the first example embodiment of the present invention.
Figure 12:
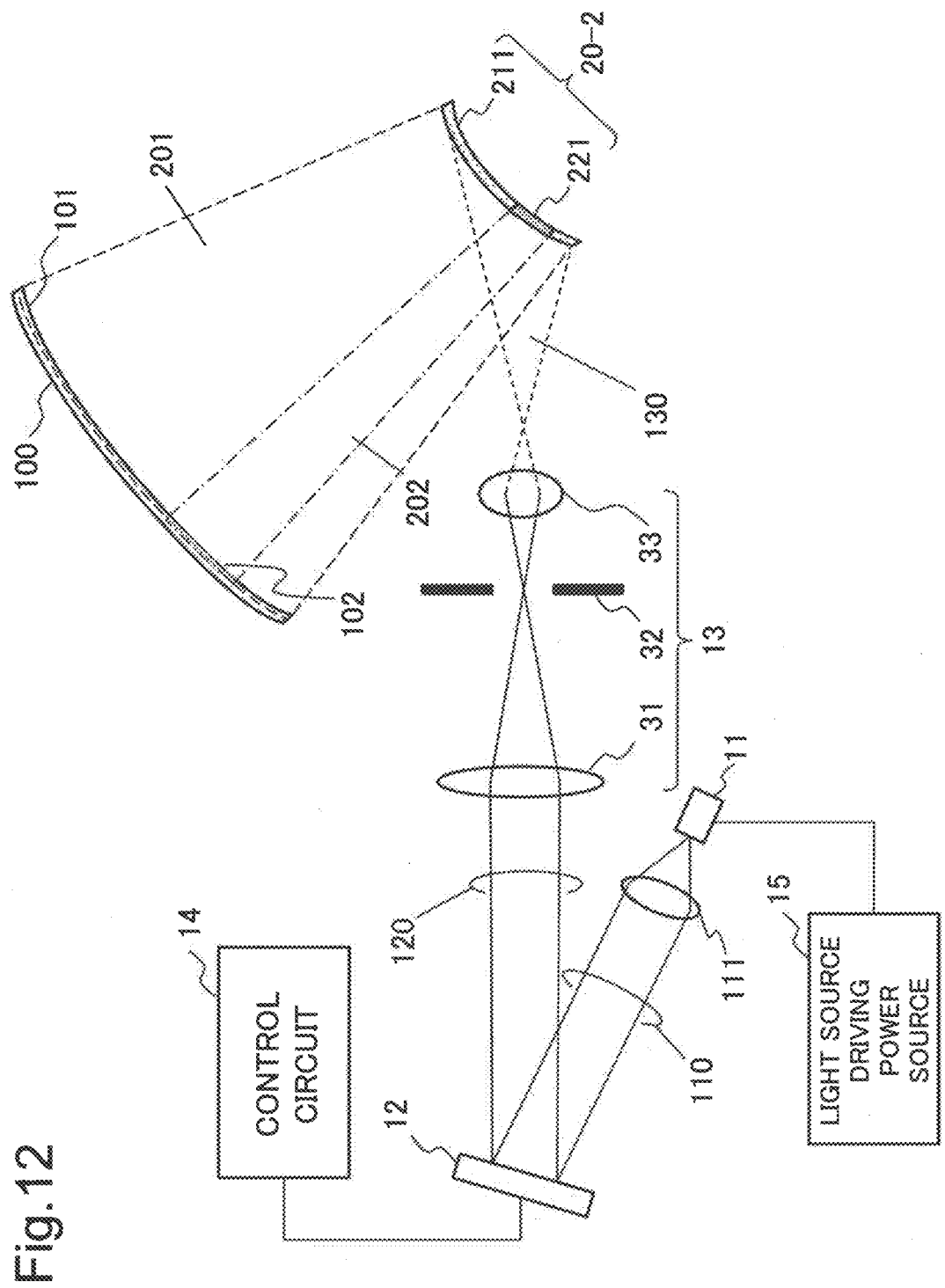
FIG. 12 is a conceptual diagram illustrating a configuration of an optical system of the display system according to the modification example of the first example embodiment of the present invention.

Herein, a modification example of the display system 1 according to the first example embodiment is described. FIG. 11 is a conceptual view illustrating an application example of a display system 1-2 according to the present modification example. FIG. 12 is a conceptual diagram illustrating a configuration of an optical system of the display system 1-2 according to the present modification example.

The display system 1-2 is different from the display system 1 in FIG. 1 in using a reflecting mirror 20-2 different from the reflecting mirror 20. In the display system 1-2, a first reflection region 211 and a second reflection region 221 are provided on a reflection surface of the single reflecting mirror 20-2. When the reflecting mirror 20-2 is matched to the reflecting mirror 20, the first reflection region 211 is equivalent to the first reflecting mirror 21, and the second reflection region 221 is equivalent to the second reflecting mirror 22. In other words, the reflecting mirror 20-2 is a single mirror which has different reflection regions. For example, curvature needs may be different between the first reflection region 211 and the second reflection region 221. The first reflection region 211 and the second reflection region 221 can be achieved by forming regions different in curvature and material on a surface of the same reflecting mirror 20-2. The first reflection region 211 reflects display information toward the wide-ranging first display region 101. The second reflection region 221 reflects display information toward the narrow-ranging second display region 102. Thus, low-accuracy display information is displayed in the first display region 101, and high-accuracy display information is displayed in the second display region 102. However, when the reflection surface of the reflecting mirror 20-2 is uniformed, a difference between display information displayed in the first display region 101 near the second display region 102 and display information displayed in the second display region 102 near the first display region 101 may not be clear. Thus, for example, curvature of the first reflection region 211 may be increased, curvature of the second reflection region 212 may be decreased, and a difference of displayed display information may be made clear. Moreover, the second reflection region 221 may be made finer than the first reflection region 211, or shapes of the first reflection region 211 and the second reflection region 221 may be changed.

According to the present modification example, an advantageous effect equivalent to that in the display system according to the first example embodiment is obtained by a single reflecting mirror. However, the present modification example is suited to a case where a difference of definition degrees of pieces of display information displayed in two display regions does not need to be made clear.

Second Example Embodiment

Figure 13:
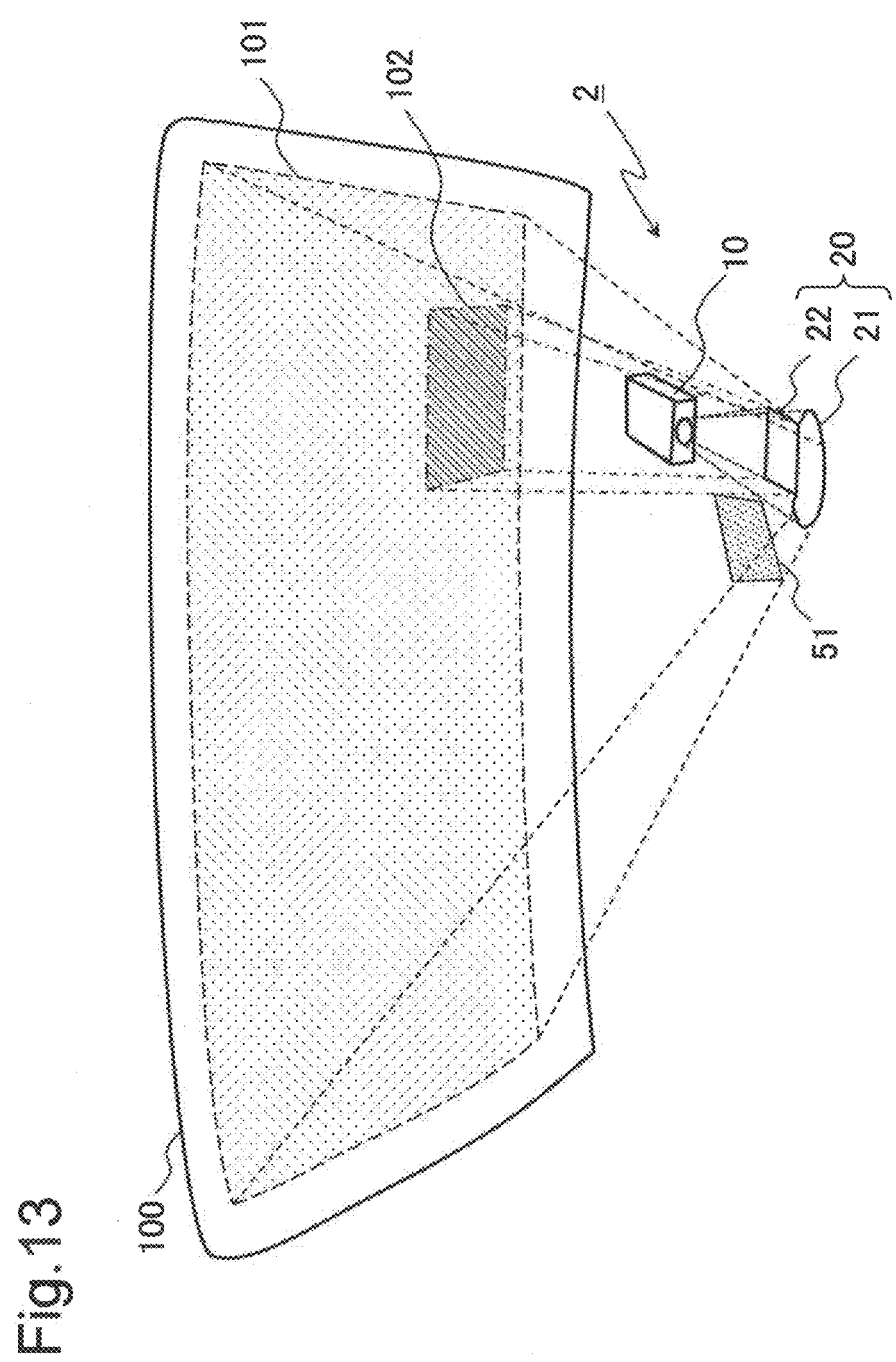
FIG. 13 is a conceptual view illustrating an application example of a display system according to a second example embodiment of the present invention.

Next, a display system 2 according to a second example embodiment of the present invention is described with reference to the drawings. FIG. 13 is a conceptual view illustrating an application example of the display system 2 according to the present example embodiment. In the present example embodiment, a diffractive optical element (hereinafter, DOE) is disposed between light reflected by a reflecting mirror 20 and at least any one display region.

In the display system 2 according to the present example embodiment, a DOE 51 is disposed in a reflection direction of light by a first reflecting mirror 21. Note that components other than the DOE 51 are similar to those in the first example embodiment.

The DOE 51 is an element which changes a traveling direction of light by utilizing a diffraction phenomenon of light. By using DOE 51, a preset high-definition image can be projected by applying a point-like image (hereinafter, spotlight) to the DOE 51.

Spotlight diffracted by the DOE 51 is produced as an image on a projection target surface. For example, the DOE 51 according to the present example embodiment can utilize an image formation capability of the DOE 51 itself, and form a different image (diffraction pattern) depending on a radiation position of spotlight. The DOE 51 emits a diffraction pattern dependent on an entrance position of spotlight. Display information itself is not drawn in the DOE 51, and when spotlight is radiated to a position where display information is recorded, display information corresponding to the position is displayed. A size of an individual grating corresponding to each piece of display information may be set according to a spot diameter of spotlight applied to the DOE 51.

Light reflected by the first reflecting mirror 21 has low resolution, but can make a pattern of a dot corresponding to spotlight. Thus, by using DOE 51, it is possible to form a high-resolution image even with low-resolution spotlight.

Note that, although an example in which display information is displayed on a windshield 100 by use of one DOE 51 is illustrated in FIG. 13, a plurality of DOEs 51 may be disposed according to a position of the windshield 100. For example, a plurality of DOEs 51 corresponding to a plurality of regions such as an upper part, a lower part, a left part, and a right part of the windshield 100 may be used.

Figure 14:
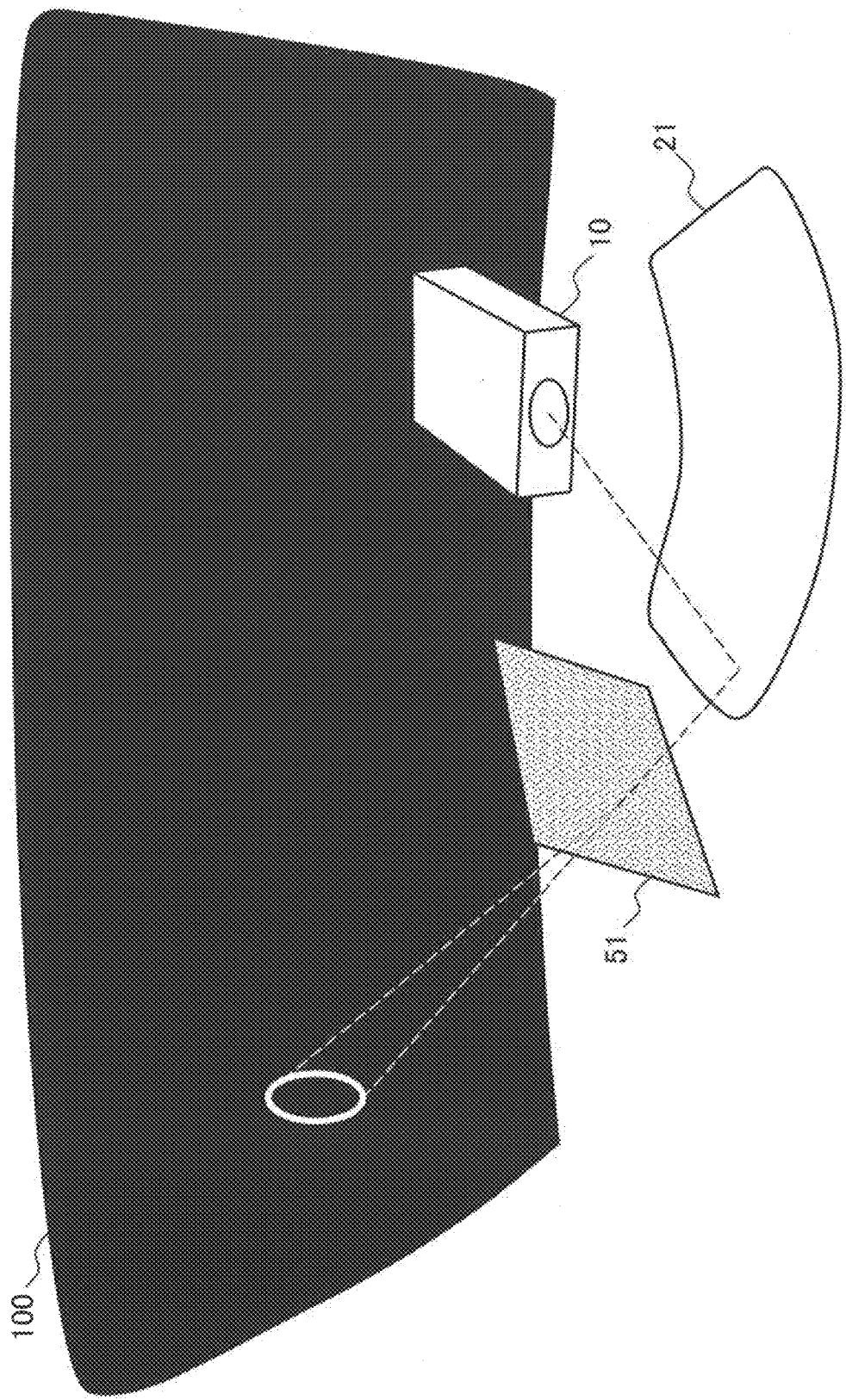
FIG. 14 is a conceptual view illustrating a projection example of display information by the display system according to the second example embodiment of the present invention.
Figure 15:
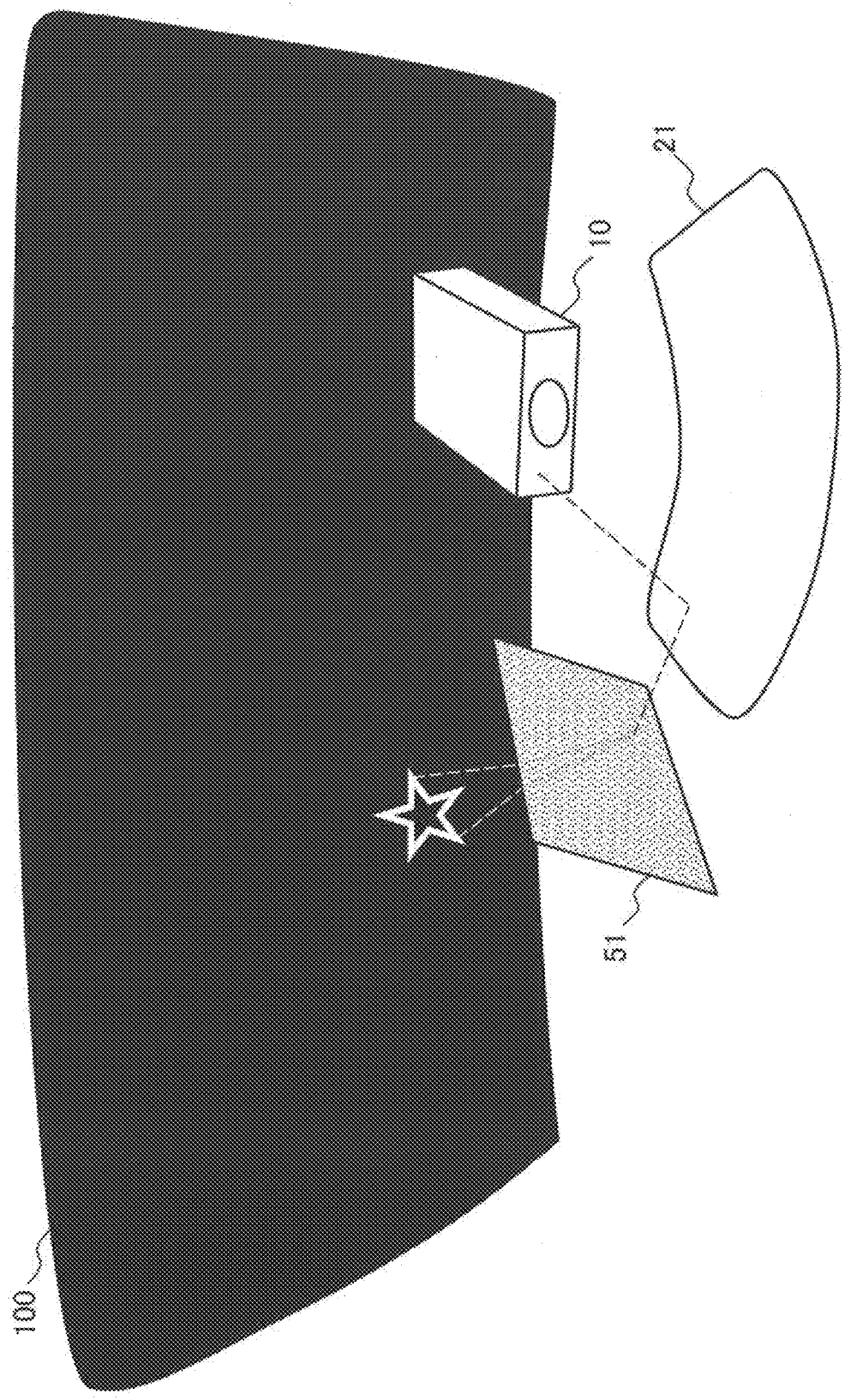
FIG. 15 is a conceptual view illustrating a projection example of display information by the display system according to the second example embodiment of the present invention.

FIGS. 14 and 15 are examples in which a position and a shape of display information displayed on the windshield 100 are changed by changing a radiation position of spotlight to the DOE 51. In the examples of FIGS. 14 and 15, elliptical or star-shaped marks are displayed on the windshield 100 as display information in such a way as to be superimposed over a target seen from a driver sitting on a driver's seat.

In order to display an elliptical mark at a position (referred to as a position A1) on the windshield 100 illustrated in FIG. 14, light is reflected toward a position (referred to as a position A2) of the DOE 51 illustrated in FIG. 14 from the first reflecting mirror 21. To this end, a control circuit 14 of a projection device 10 performs control for displaying, on a display part of a spatial light modulator element 12, a pattern with which spotlight is formed at a position (referred to as a position A3) on the first reflecting mirror 21 illustrated in FIG. 14. Accordingly, reflection light of the spotlight formed at the position A3 on the first reflecting mirror 21 is radiated to the position A2 of the DOE 51, and an elliptical mark is displayed at the position A1 on the windshield 100 as illustrated in FIG. 14.

When a target over which a mark is superimposed moves, a mark on the windshield 100 needs only to be moved according to movement of the target. In the display system 2, a mark can be moved on the windshield 100 by changing a radiation position of light radiated to the DOE 51. FIG. 15 illustrates an example of displaying a star-shaped mark by moving an elliptical mark in FIG. 14.

In order to display a star-shaped mark at a position (referred to as a position B1) on the windshield 100 illustrated in FIG. 15, spotlight is reflected toward a position (referred to as a position B2) of the DOE 51 illustrated in FIG. 15 from the first reflecting mirror 21. To this end, the control circuit 14 of the projection device 10 performs control for displaying, on the display part of the spatial light modulator element 12, a pattern with which spotlight is formed at a position (referred to as a position B3) on the first reflecting mirror 21 illustrated in FIG. 15. Accordingly, reflection light of the spotlight formed at the position B3 on the first reflecting mirror 21 is radiated to the position B2 of the DOE 51, and a star-shaped mark is displayed at the position B1 on the windshield 100 as illustrated in FIG. 15.

As a result, the display system 2 is able to vary a position where a mark is displayed, from the position A1 to the position B1, on the windshield 100. In other words, the display system 2 can move and vary display information on the windshield 100 without moving a movable part. When the DOE 51 is used, not a pattern corresponding to display information but a pattern with which light is radiated to a particular position of the DOE 51 may be displayed on the display part of the spatial light modulator element 12. Thus, the display system 2 is able to display display information having same luminance on the windshield 100 with low power as compared with the display system 1 according to the first example embodiment.

Figure 16:
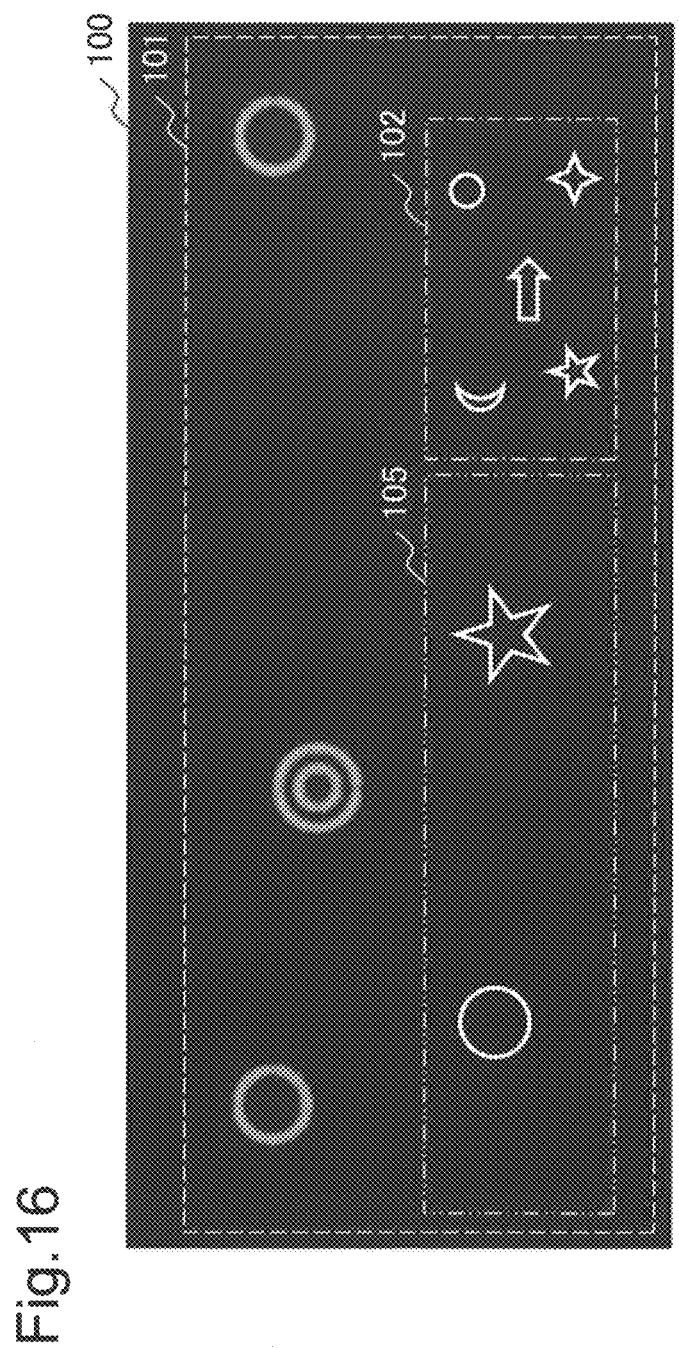
FIG. 16 is a conceptual diagram illustrating one example of display information displayed in each display region by the display system according to the second example embodiment of the present invention.

FIG. 16 is an example of displaying display information having various shapes on the windshield 100 by use of the DOE 51. Display information via the DOE 51 is displayed in a partial display region 105 of a first display region 101 in FIG. 16. Note that, an outer frame (broken line) of the first display region 101, an outer frame (one-dot chain line) of a second display region 102, and an outer frame (two-dot chain line) of the partial display region 105 indicate virtual boundaries, and are not actually displayed on the windshield 100.

As in FIG. 16, light reflected by the first reflecting mirror 21 is displayed as low-definition display information in the first display region 101, and light reflected by a second reflecting mirror 22 is displayed as high-definition display information in the second display region 102. In the example of FIG. 16, a part of light reflected by the first reflecting mirror 21 is displayed in the partial display region 105 via the DOE 51. A definition degree of light projected via the DOE 51 is attributed to a characteristic of the DOE 51. Thus, when the DOE 51 being capable of projecting an image having a high definition degree is used, high-definition display information can be displayed in the partial display region 105.

When the DOE 51 is used, it is difficult to give such a fine change as to move display information dot by dot, but when a limited kind of display information is used, it is possible to exhibit smooth movement of display information by making a grating of the DOE 51 finer.

Furthermore, when the DOE 51 is used, a pattern with which a spot is located at each grating of the DOE 51 may be used. For example, when the DOE 51 has 100 gratings, a pattern with which light spots are formed at positions of these gratings needs only to be stored in a storage circuit 43. Moreover, by storing a spot-shaped basic pattern in the storage circuit 43, and performing a calculation of moving the basic pattern by the control circuit 14, a spot may be moved.

Figure 17:
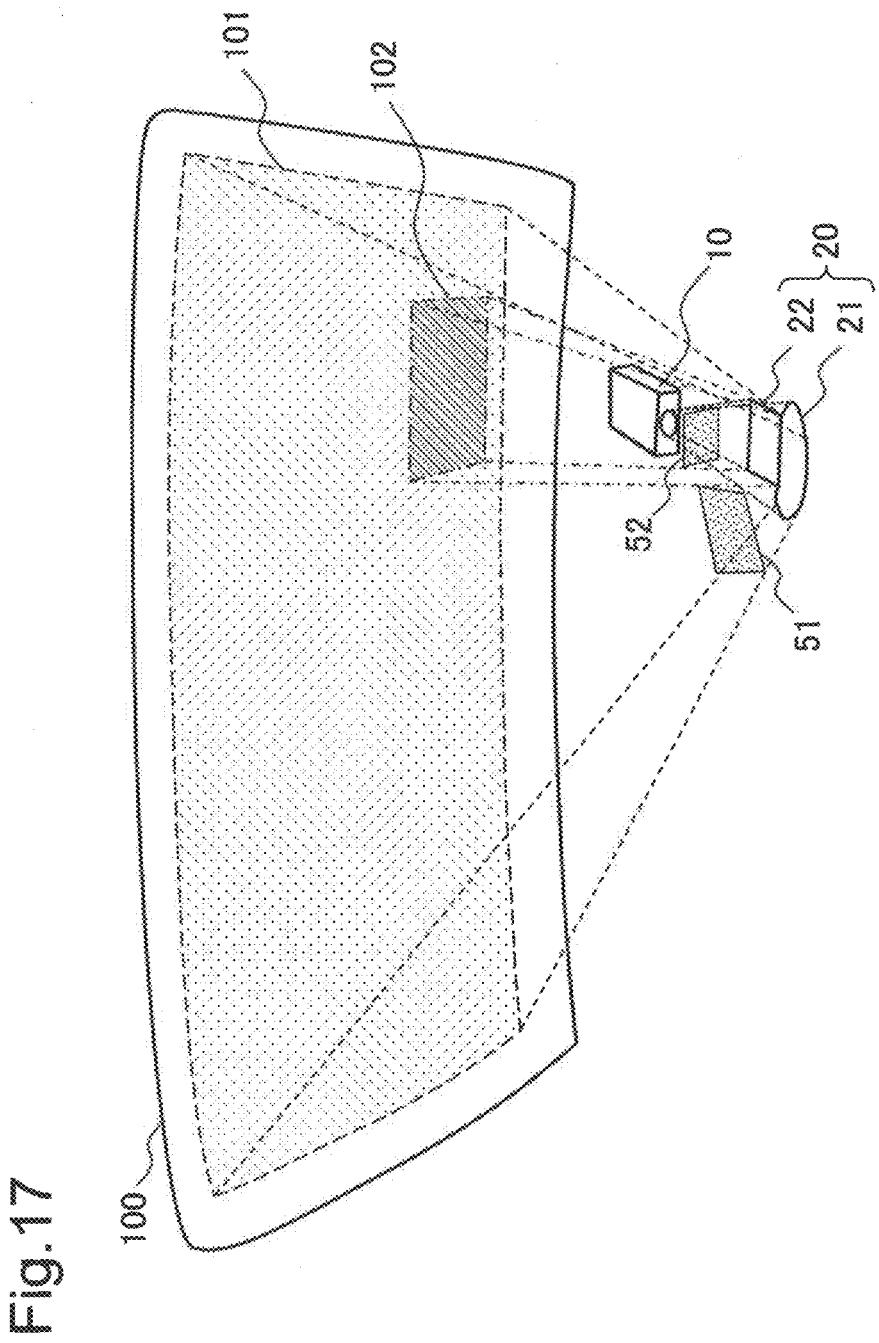
FIG. 17 is a conceptual view illustrating a modification example of an application example of the display system according to the second example embodiment of the present invention.

Herein, a modification example of the display system 2 in FIG. 13 is illustrated in FIG. 17. In the modification example of FIG. 17, a DOE 52 is disposed in a reflection direction of light by the second reflecting mirror 22. The DOE 52 has a configuration similar to that of the DOE 51.

In the examples of FIGS. 14 to 16, examples in which display information displayed in the first display region 101 is heightened in definition by use of the DOE 51 have been presented. In the modification example of FIG. 17, display information displayed in the second display region 102 is heightened in accuracy by use of the DOE 52. For example, fixed display information such as a road sign is more efficient when heightened in definition by use of the DOE 52.

As described above, according to the display system in the present example embodiment, an advantageous effect similar to that in the first example embodiment can be obtained, and high-definition display information can be displayed with lower power than in the first example embodiment.

Third Example Embodiment

Figure 18:
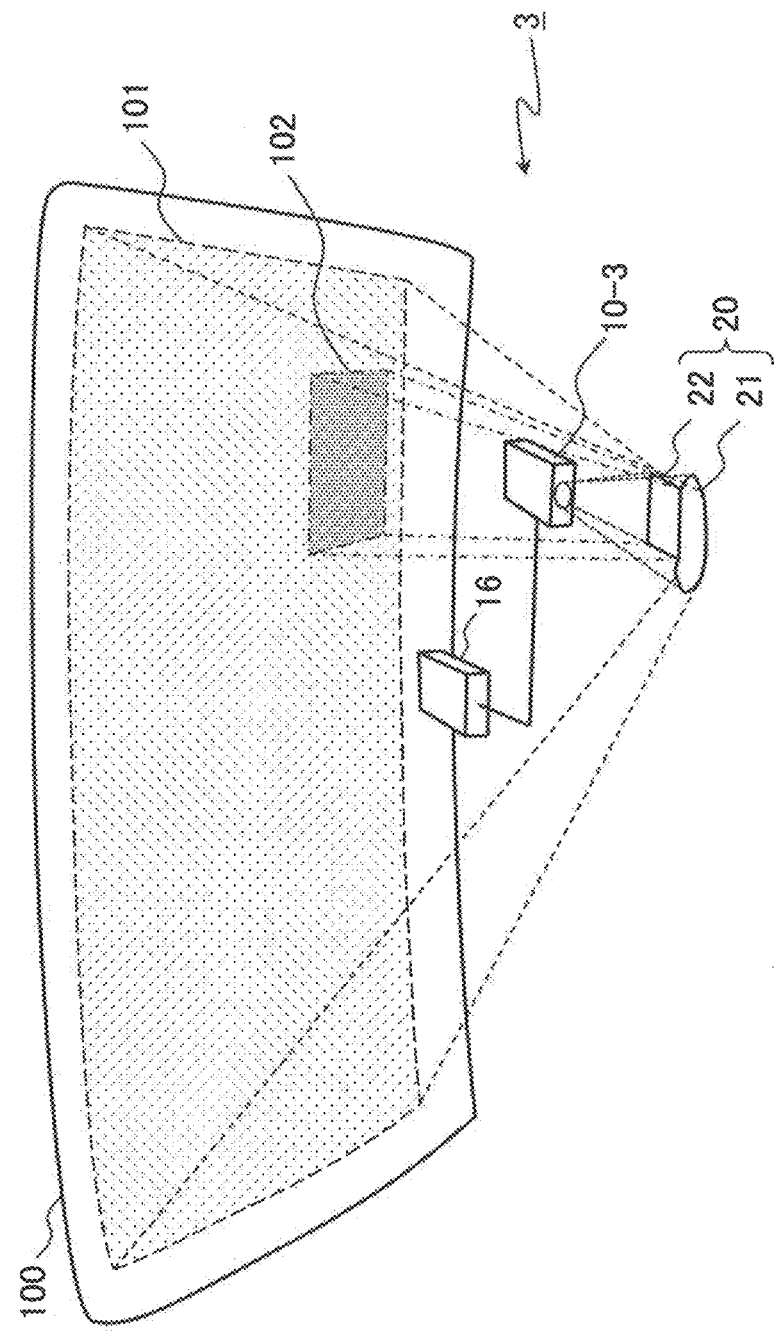
FIG. 18 is a conceptual view illustrating an application example of a display system according to a third example embodiment of the present invention.
Figure 19:
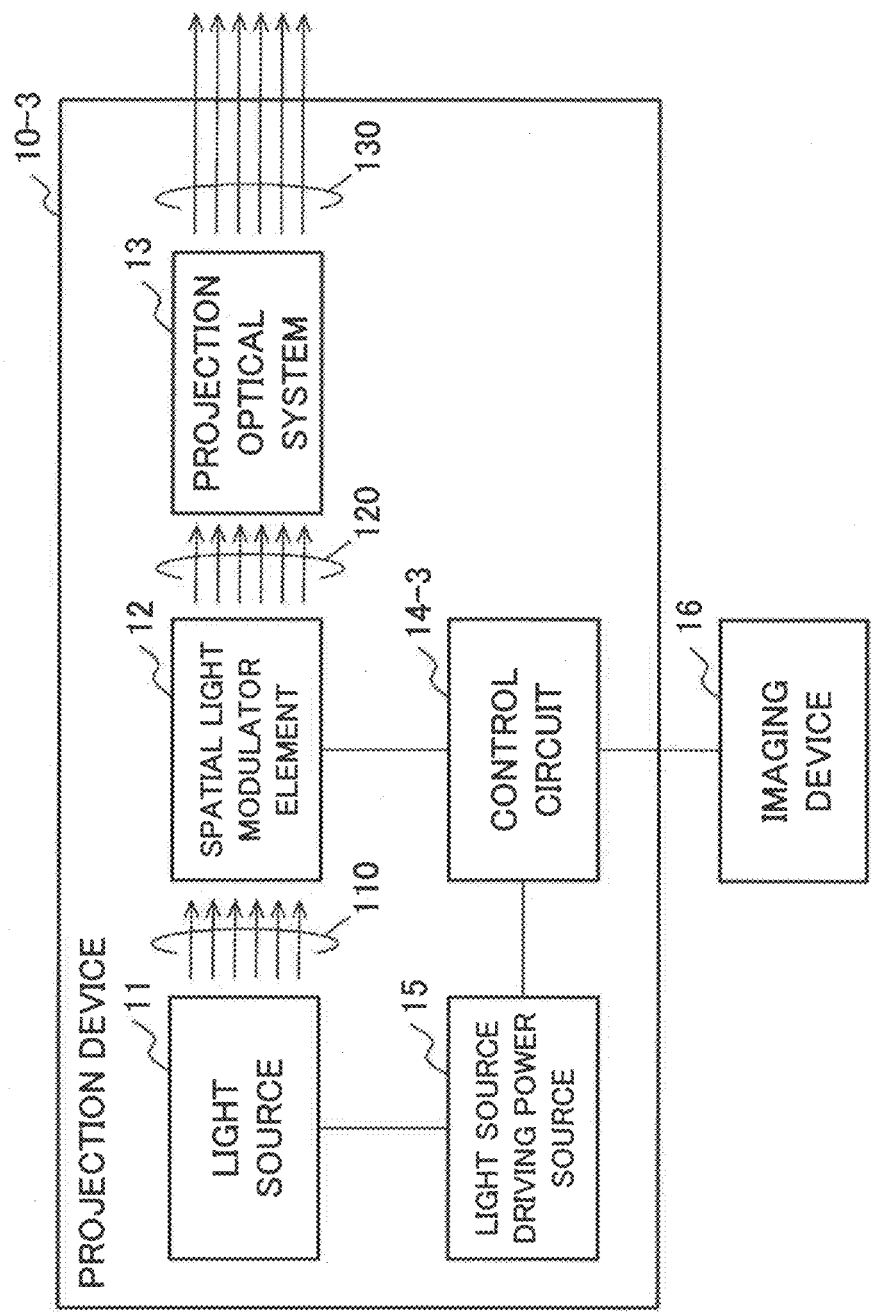
FIG. 19 is a block diagram illustrating a configuration of a projection device of the display system according to the third example embodiment of the present invention.

Next, a display system 3 according to a third example embodiment of the present invention is described with reference to the drawings. FIG. 18 is a conceptual diagram illustrating an application example of the display system 3 according to the present example embodiment. FIG. 19 is a conceptual diagram illustrating a configuration of a projection device of the display system 3 according to the present example embodiment. The display system 3 includes an imaging device 16 in addition to a projection device 10-3.

As in FIG. 18, the display system 3 includes the imaging device 16 which images an outside of a vehicle. Although an example in which the imaging device 16 is placed on a dashboard is illustrated in FIG. 18, the imaging device 16 is placed at any place. For example, the imaging device 16 may be placed on a backside of a rearview mirror, may be placed on a ceiling above a driver's seat or a passenger seat, or may be placed above a seat of a driver's seat or a passenger seat. Alternatively, the imaging device 16 may be placed outside of a vehicle. Moreover, the imaging device 16 may image not only a front side of a vehicle, but also a range including a lateral side and a rear side.

As in FIG. 19, the imaging device 16 is connected to a control circuit 14-3 of the projection device 10-3. Note that, the imaging device 16 may be directly connected to the control circuit 14-3, or may be connected to the control circuit 14-3 with another interface, circuit, or device in between.

Figure 20:
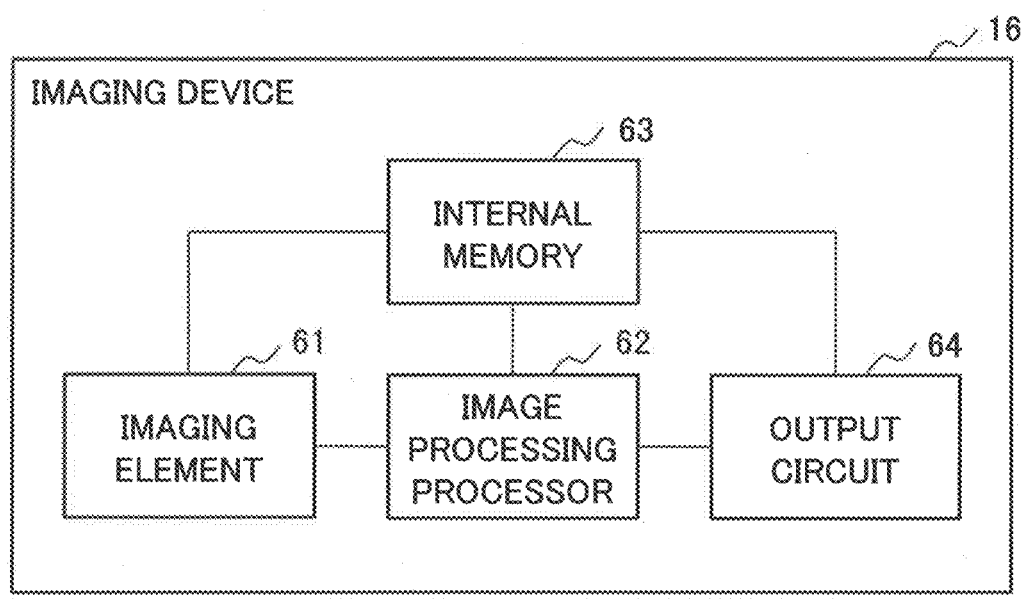
FIG. 20 is a block diagram illustrating a configuration of an imaging device of the display system according to the third example embodiment of the present invention.

FIG. 20 is a block diagram illustrating a configuration of the imaging device 16. As in FIG. 20, the imaging device 16 includes an imaging element 61, an image processing processor 62, an internal memory 63, and an output circuit 64.

The imaging element 61 is, for example, an element for imaging an outside of a vehicle, and thus acquiring imaging data. The imaging element 61 is a photoelectric conversion element in which semiconductor components are formed into an integrated circuit. The imaging element 61 can be achieved by a solid-state imaging element such as a charge-coupled device (CCD) or a complementary metal-oxide-semiconductor (CMOS). Normally, the imaging element 61 is configured by an element which images light in a visible region. However the imaging element 61 may be configured by an element which can image and detect an infrared ray, an ultraviolet ray, an X-ray, a gamma ray, an electric wave, or an electromagnetic wave such as a microwave.

The image processing processor 62 is an integrated circuit which executes, for imaging data imaged by the imaging element 61, image processing such as dark current correction, interpolation calculation, color space conversion, gamma correction, correction of aberration, noise reduction, and image compression. Note that, when image information is output without being processed, the image processing processor 62 may be omitted.

The internal memory 63 is a storage element which transitorily saves image information that cannot be processed when image processing is performed by the image processing processor 62, and processed image information. Note that the internal memory 63 may be configured in such a way that image information imaged by the imaging element 61 is transitorily stored in the internal memory 63. The internal memory 63 can be configured by a general memory.

The output circuit 64 outputs image information processed by the image processing processor 62 to the control circuit 14-3.

Figure 21:
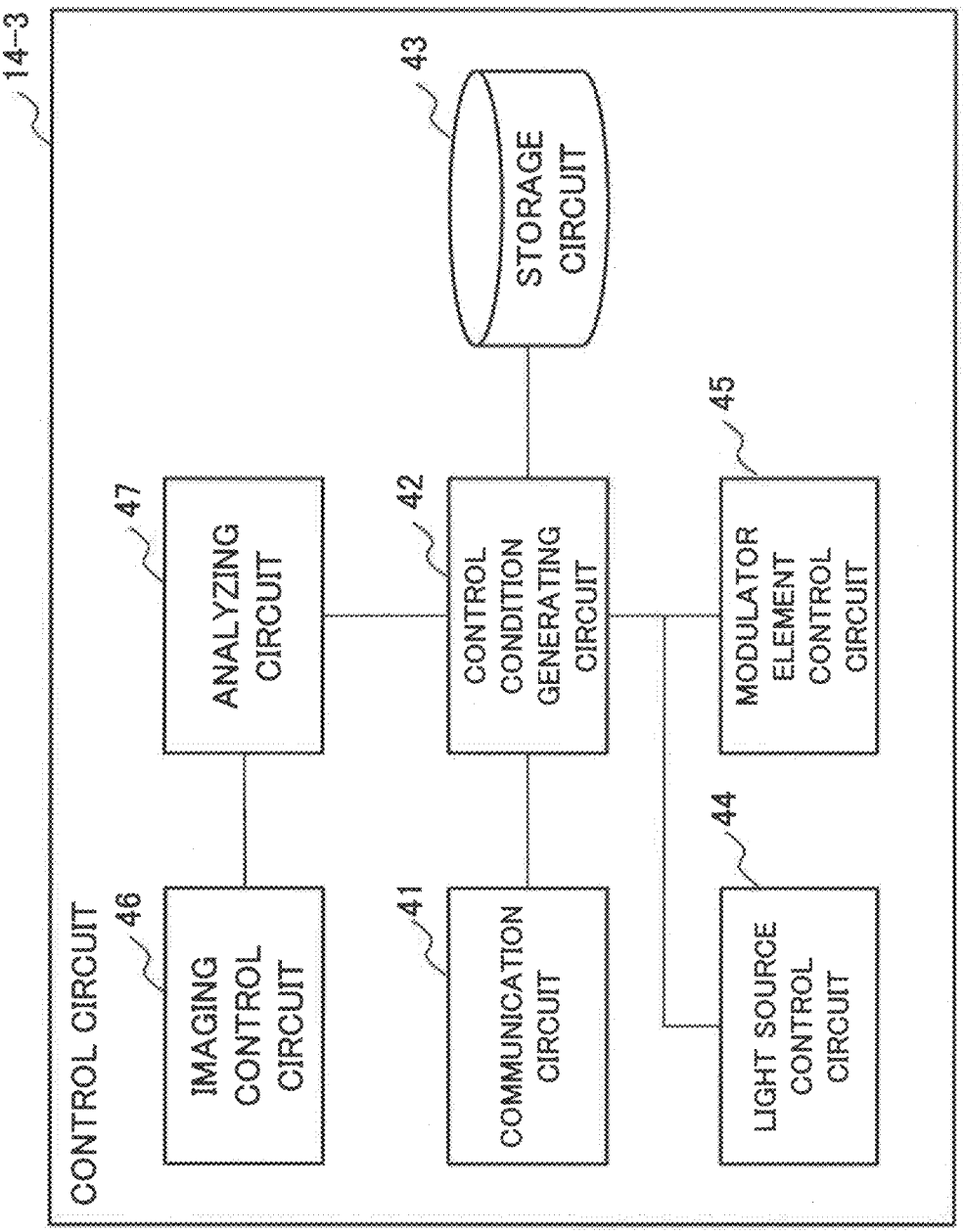
FIG. 21 is a block diagram illustrating a configuration of a control circuit of the display system according to the third example embodiment of the present invention.

FIG. 21 is a block diagram illustrating a configuration of the control circuit 14-3. The control circuit 14-3 in FIG. 21 has a configuration in which an imaging control circuit 46 and an analyzing circuit 47 are added to the control circuit 14 in FIG. 7. Note that a detailed description is omitted for components within the control circuit 14-3 in FIG. 21 which are included in the control circuit 14.

The imaging control circuit 46 is a circuit which controls the imaging device 16 to image. The imaging control circuit 46 controls the imaging device 16 in such a way as to image at predetermined timing. Predetermined timing may be a regular interval, or an interval may be varied depending on a situation. In a running period of a vehicle, the imaging control circuit 46 preferably controls in such a way as to control the imaging device 16 to image in a short period such as several times to several ten times per second. In a stop period and a parking period of a vehicle, the imaging control circuit 46 may control the imaging device 16 in such a way as to control the imaging device 16 to image in a longer period than during running or image at appropriate timing, or stop the imaging device 16.

The imaging device 16 outputs, to the control circuit 14-3, image data imaged depending on control of the imaging control circuit 46.

The imaging control circuit 46 acquires image data imaged by the imaging device 16, and outputs the image data to the analyzing circuit 47.

The analyzing circuit 47 analyzes image data imaged by the imaging device 16, and detects a detection target from the image data. When a driver sees a detection target through a windshield 100, the analyzing circuit 47 specifies a position where display information is superimposed over the detection target on the windshield 100. The analyzing circuit 47 generates positional information in which a specified position on the windshield 100 is fitted to a two-dimensional coordinate system set on the windshield 100. The analyzing circuit 47 outputs the generated positional information to the control condition generating circuit 42.

The control condition generating circuit 42 generates a control condition for displaying display information at a position corresponding to positional information generated by the analyzing circuit 47. Then, the control condition generating circuit 42 outputs the generated control condition.

Figure 22:
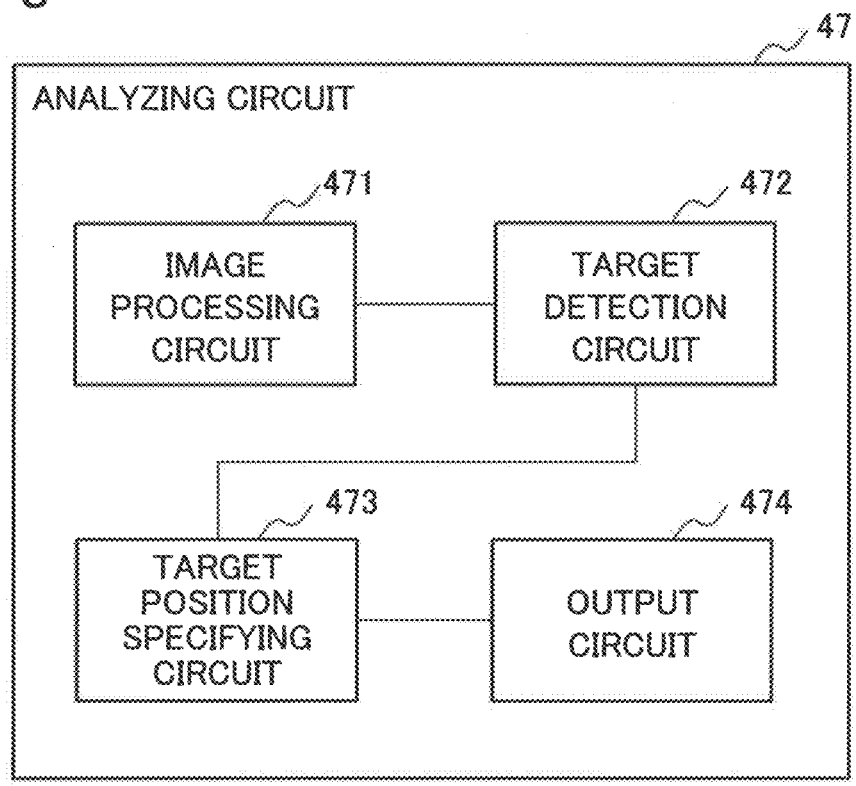
FIG. 22 is a block diagram illustrating a configuration of an analyzing circuit of the display system according to the third example embodiment of the present invention.

Next, a detailed configuration of the analyzing circuit 47 is described by use of FIG. 22. FIG. 22 is a block diagram illustrating a configuration of the analyzing circuit 47. As in FIG. 22, the analyzing circuit 47 includes an image processing circuit 471, a target detection circuit 472, a target position specifying circuit 473, and an output circuit 474.

The image processing circuit 471 applies image processing to image data acquired by the imaging control circuit 46, and converts the image data into data in which a detection target can be easily detected. For example, the image processing circuit 471 may be configured as an integrated circuit which executes, for acquired imaging data, image processing such as dark current correction, interpolation calculation, color space conversion, gamma correction, correction of aberration, noise reduction, and image compression. The image processing circuit 471 outputs, to the target detection circuit 472, image data (hereinafter, processed data) to which image processing is applied.

The target detection circuit 472 acquires processed data from the image processing circuit 471, and detects a detection target from the acquired processed data. The target detection circuit 472 detects a detection target by use of a predetermined algorithm.

For example, the target detection circuit 472 compares successive processed data, and extracts a background from each piece of processed data. The target detection circuit 472 may detect, as a detection target, a target included in data in which a background is subtracted from processed data.

For a purpose of preventing an accident or the like, the target detection circuit 472 may detect, as a detection target, an object presenting a large movement with respect to a background. When a detection target is a person, the target detection circuit 472 needs only to use an algorithm which detects a characteristic movement of a body resulting from walking or running of the person, or an algorithm for person detection. When a detection target is an automobile, the target detection circuit 472 may use an algorithm which detects a shape or movement of an automobile, or an algorithm which extracts relative changes of an automobile and a road surface. Alternatively, the target detection circuit 472 may generate and thus prepare normal background data (normal data) from a plurality of pieces of processed data, calculate a difference between the processed data and normal data, and then detect a detection target.

When detecting a detection target from processed data, the target detection circuit 472 outputs, to the target position specifying circuit 473, a position of the detection target on the processed data.

When a driver sees a detection target through the windshield 100, the target position specifying circuit 473 specifies a position where display information displayed on the windshield 100 is superimposed over the detection target and thus visually recognized. The target detection circuit 472 outputs specified positional information to the output circuit 474.

For example, the target position specifying circuit 473 may save association information such as a table or an arithmetic expression which associates a position on the windshield 100 seen from a viewpoint of a driver with a position on processed data. Accordingly, when acquiring a position of a detection target on processed data, the target position specifying circuit 473 is able to derive a position on the windshield 100 seen from a viewpoint of a driver, based on association information. However, since a position on the windshield 100 and a position on processed data deviate from each other depending on a distance between the display system 3 and a detection target, the display system 3 preferably cooperates with a system which measures a distance between the display system 3 and a detection target.

The output circuit 474 outputs, to the control condition generating circuit 42, positional information of a detection target specified by the target position specifying circuit 473.

Furthermore, the analyzing circuit 47 may also include a circuit which tracks a detection target detected by the target detection circuit 472. There is a case where a calculation amount can be reduced when a detection target once detected is tracked by use of a particular algorithm than when the detection target is kept detected from image data each time. For example, the analyzing circuit 47 is able to track a detection target by use of a technique such as Camshift or Meanshift. Alternatively, the analyzing circuit 47 may track a detection target by use of a feature extraction method such as scale-invariant feature transform (SIFT) or histograms of oriented gradients (HOG). Alternatively, the analyzing circuit 47 may track a detection target by use of a feature extraction method such as speed up robust features (SURF).

As described above, according to the display system in the present example embodiment, it is possible to detect, in accordance with running of a vehicle mounted with a display system, a detection target having a fear of affecting the running of the vehicle, and display, on a windshield, display information superimposed over the detection target.

Application Example

Figure 23:
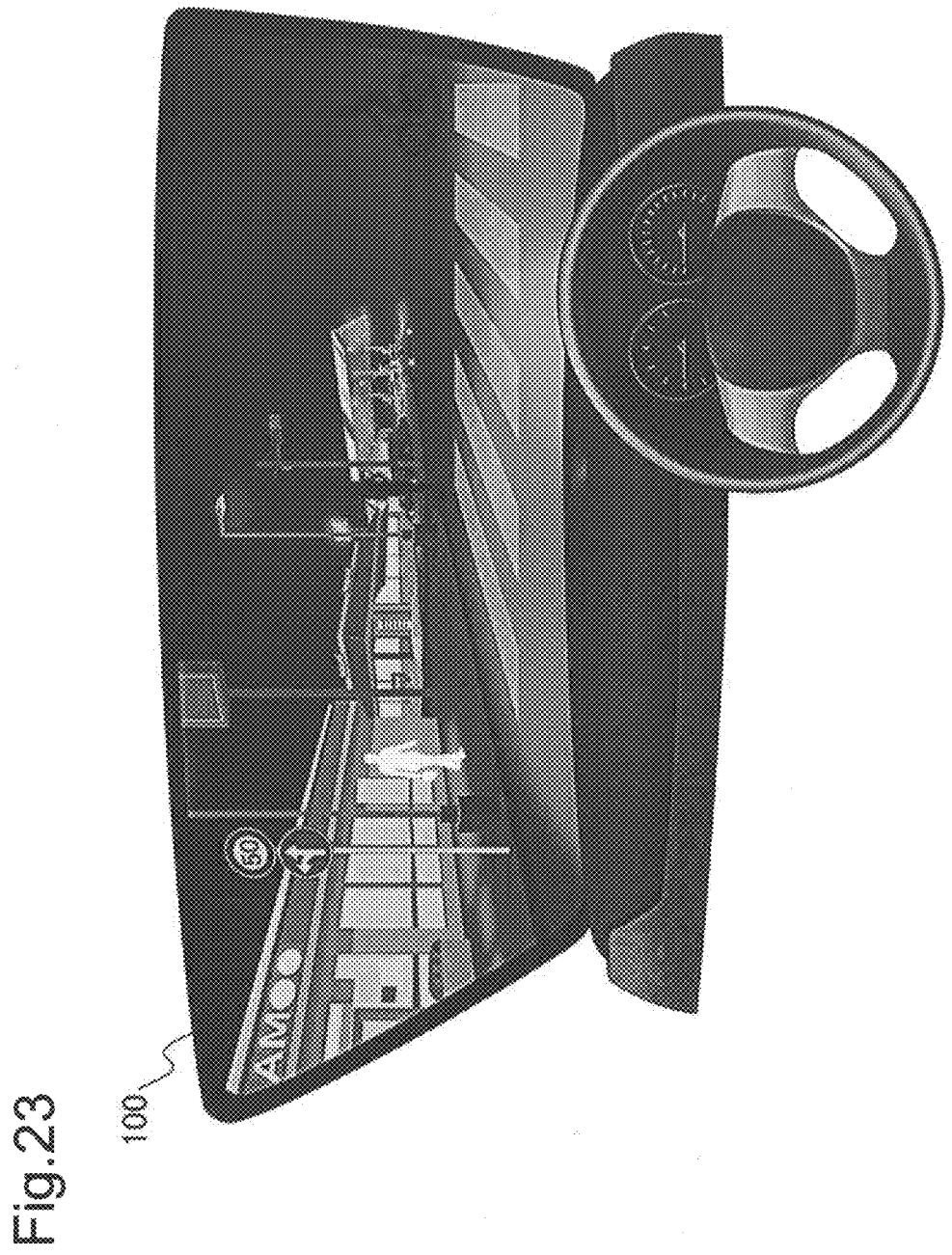
FIG. 23 is a conceptual view of a general field of vision from a driver.
Figure 24:
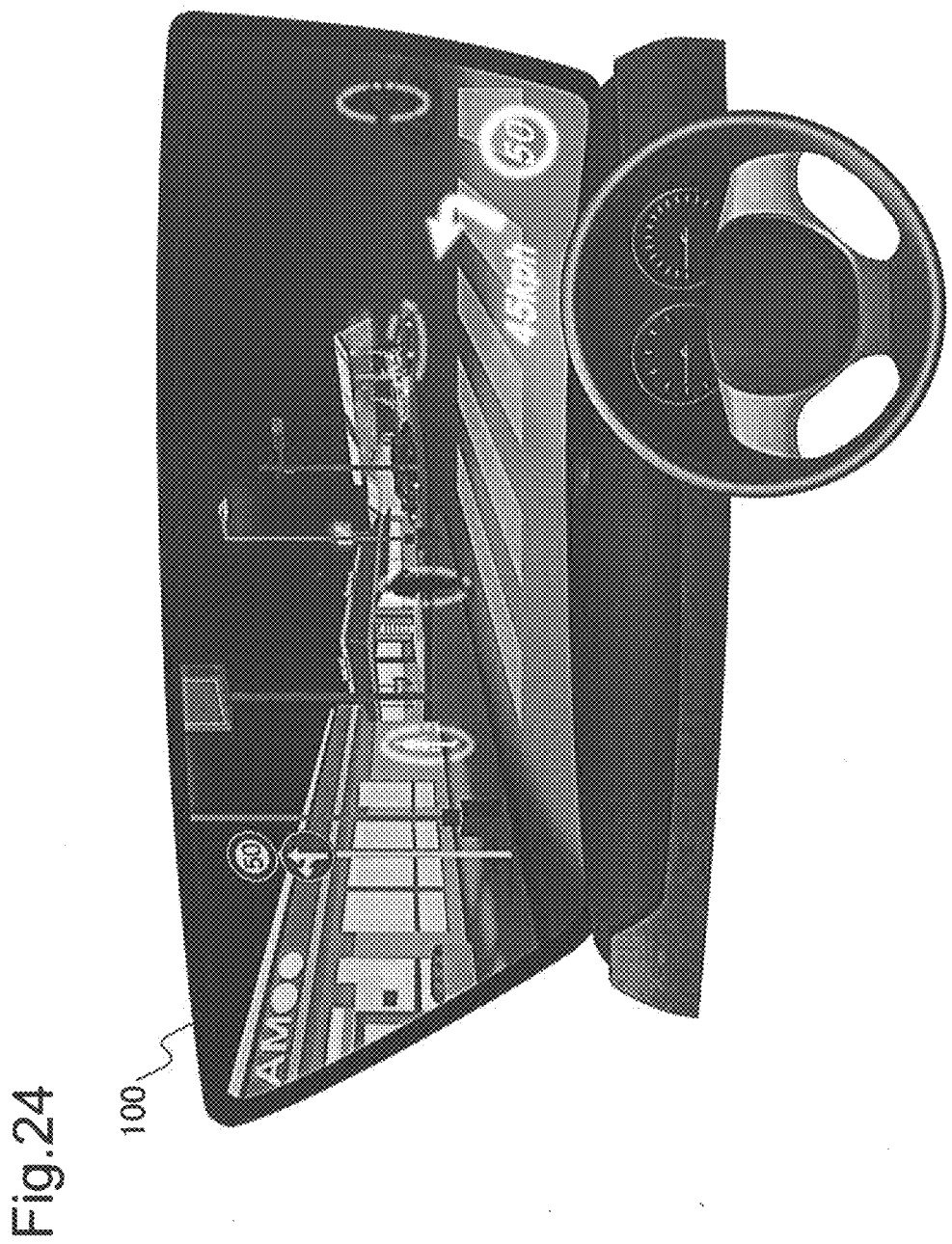
FIG. 24 is a projection example of display information by a general head-up display.

FIGS. 23 to 25 are specific examples for describing a display system according to the example embodiments of the present invention.

FIG. 23 is one example of a field of vision seen from a driver's seat of a vehicle. At night, it becomes difficult to visually recognize a target to which light is not applied. In the example of FIG. 23, a person riding a bicycle, a running person, a person walking on a sidewalk, a vehicle exiting from a gas station, or the like may be a target having a potential of a danger.

FIG. 24 is an example of displaying display information on the windshield 100 by a general head-up display (hereinafter, HUD).

In the example of FIG. 24, basic information about driving, such as a speed limit, a running speed, and an instruction from a navigation system is displayed ahead of a driver's seat. Specifically, basic information indicating that a speed limit is 50 kilometers per hour, and that a running speed is 45 kilometers per hour, and instruction information (arrow) recommending to turn left are displayed ahead of a driver's seat. In the example of FIG. 24, display information (elliptical mark) superimposed over a target having a potential of becoming a danger is also displayed on the entire windshield 100.

In a general HUD, light is evenly radiated to the entire windshield 100, and therefore, it is necessary to increase output of a light source in order to display high-definition display information. In other words, in a general HUD, a definition degree of display information deteriorates when output of a light source is decreased, and therefore, a trade-off occurs between lowering power of a light source and increasing a definition degree of display information.

In the example of FIG. 25, display information having different definition degrees between the first display region 101 and the second display region 102 is displayed by use of the display system in the present example embodiment. Note that, in FIG. 25, an outer frame (broken line) of the first display region 101, and an outer frame (one-dot chain line) of a second display region 102 indicate boundaries of the respective regions, and are not actually displayed.

In the first display region 101 which is not close to a driver's seat, display information superimposed over a running person or a pedestrian is displayed with low definition. On the other hand, in the second display region 102 which is close to a driver's seat, display information superimposed over a person riding a bicycle or over a vehicle, an instruction from a navigation system, display information about a speed limit and a running speed are displayed with high definition.

Generally, a driver needs to drive while carefully watching ahead, and yet paying attention to a lateral danger. Therefore, while a driver only takes a glance laterally, a time in which a driver watches display information displayed ahead of a driver's seat is long. Thus, while a requirement of a definition degree for display information ahead of a driver's seat is high, a definition degree is not so much required for display information displayed in a region which is not located ahead of a driver's seat.

In the display system according to the present example embodiment, low-definition display information is displayed in the first display region 101, and high-definition display information is displayed in the second display region 102. As a result, according to the present example embodiment, it is possible to improve visibility of display information by a driver even when a light source lower in output than a general HUD is used.

The example embodiments and examples of the present invention have been described above. However, the present invention is not limited to contents described in each of the example embodiments and examples described above, and a configuration and an operation therein can be variously modified without departing from the spirit of the present invention.

This application is based upon and claims the benefit of priority from Japanese Patent Application No. 2016-184074, filed on Sep. 21, 2016, the disclosure of which is incorporated herein in its entirety by reference.

REFERENCE SIGNS LIST 1, 2, 3 Display system
10 Projection device
11 Light source
12 Spatial light modulator element
13 Projection optical system
14 Control circuit
15 Light source driving power source
16 Imaging device
20 Reflecting mirror
21 First reflecting mirror
22 Second reflecting mirror
31 Fourier transform lens
32 Aperture
33 Projection lens
41 Communication circuit
42 Control condition generating circuit
43 Storage circuit
44 Light source control circuit
45 Modulator element control circuit
46 Imaging control circuit
47 Analyzing circuit
51, 52 DOE
61 Imaging element
62 Image processing processor
63 Internal memory
64 Output circuit
111 Collimator
400 Control substrate
401 Processor
402 Main storage device
403 Auxiliary storage device
405 Input/output interface
406 Network adaptor
471 Image processing circuit
472 Target detection circuit
473 Target position specifying circuit
474 Output circuit

The invention claimed is:

1. A display system comprising:
a projector configured to include a phase-modulation-type spatial light modulator element, a light source configured to radiate light to a display part of the spatial light modulator element, and a controller configured to control the spatial light modulator element and the light source, the projector being configured to project reflection light of a display part of the spatial light modulator element; and
a reflecting mirror configured to reflect projection light of the projector, wherein
the controller is configured to display, on a display part of the spatial light modulator element, a first pattern and a second pattern associated with pieces of display information having different definition degrees, and
the reflecting mirror includes
a first reflection region which causes reflection light of a portion where the first pattern is displayed to enter, and then reflects the reflection light toward a first display region, and
a second reflection region which causes reflection light of a portion where the second pattern is displayed to enter, and then reflects the reflection light toward a second display region.

2. The display system according to claim 1, wherein
the second pattern is associated with display information having a higher definition degree than that of the first pattern, and
the second display region is set in a region being visually recognized more easily than the first display region.

3. The display system according to claim 2, wherein
the first display region is set in a region larger than the second display region, and
magnification of light reflected by the second reflection region is set in such a way as to be smaller than magnification of light reflected by the first reflection region.

4. The display system according to claim 1, wherein
the reflecting mirror is configured by combining a first reflecting mirror including the first reflection region and a second reflecting mirror including the second reflection region.

5. The display system according to claim 1, wherein
a light absorption member is disposed on an optical path of 0-th light included in reflection light of the spatial light modulator element.

6. The display system according to claim 1, further comprising
at least one diffraction optical element configured to be disposed at a position where light reflected by the reflecting mirror enters, and emitting a diffraction pattern dependent on an entrance position of light, wherein the controller sets an entrance position of light into the diffraction optical element, by a position of spotlight displayed on a display part of the spatial light modulator element.

7. The display system according to claim 6, further comprising a plurality of the diffraction optical elements associated with at least one of the first reflection region and the second reflection region.

8. The display system according to claim 1, displaying display information on a windshield of a vehicle, and further comprising an imager configured to image an outside of the vehicle, wherein the controller analyzes image data imaged by the imager, and then detects a detection target included in the image data.

9. The display system according to claim 8, wherein the controller has association information associating a position on the windshield seen from a viewpoint of a driver who drives the vehicle, with a position on the image data imaged by the imager, and when the detection target is detected, the controller specifies, based on the association information, a position on the windshield associated with a position of the detection target on the image data, and sets a pattern to be displayed on a display part of the spatial light modulator element in such a way that desired display information is displayed at the specified position of the detection target on the windshield.

10. A vehicle comprising the display system according to claim 1.

* * * * *